(12) United States Patent
Nishiumi et al.

(10) Patent No.: US 6,332,840 B1
(45) Date of Patent: *Dec. 25, 2001

(54) OPERATION CONTROLLING DEVICE AND VIDEO PROCESSING SYSTEM USED THEREWITH

(75) Inventors: Satoshi Nishiumi; Kazuo Koshima, both of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/225,466

(22) Filed: Jan. 6, 1999

Related U.S. Application Data

(63) Continuation of application No. 08/719,019, filed on Sep. 24, 1996, now Pat. No. 6,001,015.

(30) Foreign Application Priority Data

Oct. 9, 1995 (JP) ..................................... 7-288006

(51) Int. Cl.[7] ............................ G06F 3/033; A63B 13/06
(52) U.S. Cl. ............................................. 463/38; 345/161
(58) Field of Search ................................. 463/36, 37, 38, 463/43, 44, 45; 273/148 B; 345/156, 161, 162

(56) References Cited

U.S. PATENT DOCUMENTS

| D. 316,879 | 5/1991 | Shulman et al. . |
| D. 317,946 | 7/1991 | Tse . |

(List continued on next page.)

FOREIGN PATENT DOCUMENTS

| B-90881/91 | 6/1992 | (AT) . |
| 32 04 428 | 8/1983 | (DE) . |
| 40 18 052 | 12/1990 | (DE) . |
| 268 419 | 5/1988 | (EP) . |
| 431 723 | 6/1991 | (EP) . |
| 0 470 615 | 2/1992 | (EP) . |

(List continued on next page.)

OTHER PUBLICATIONS

Drucker et.al., "Cinema: A System for Procedural Camera Movements", *Proceedings of the Symposium on Interactive 3D Graphics*, Cambridge, MA Mar. 29–Apr. 1, 1992, pp. 67–70.

(List continued on next page.)

*Primary Examiner*—Jessica J. Harrison
(74) *Attorney, Agent, or Firm*—Nixon & Vanderhye P.C.

(57) ABSTRACT

A video processing system is described including a video processing device which generates a sequence of video display frames on a display unit under the control of a stored program, and a unique operation controlling device which is connected to the video processing device and which supplies signals in response to an operator's manipulation, to change the video data generated by the video processing device. The video processing device includes a replaceable program memory, first data receiving circuitry, a central processing unit, first data sending circuitry and a video signal generation circuitry. The operation controlling device may include various operation controlling buttons, switches, an operation member, rotor bodies, rotation detection mechanisms, counting circuitry, reset signal generation circuitry, second receiving circuitry, transfer circuitry and second sending circuitry. Advantageously, the operation controlling mechanism may be utilized to permit user control of a displayed object via said operation member and at the same time independently control movement of another displayed object via control switches protruding from the operation controlling mechanism housing.

30 Claims, 16 Drawing Sheets

U.S. PATENT DOCUMENTS

| | | |
|---|---|---|
| D. 357,712 | 4/1995 | Wu . |
| D. 363,092 | 10/1995 | Hung . |
| D. 375,326 | 11/1996 | Yokoi et al. . |
| 3,666,900 | 5/1972 | Rothweiler et al. . |
| 3,729,129 | 4/1973 | Fletcher et al. . |
| 3,827,313 | 8/1974 | Kiessling . |
| 4,148,014 | 4/1979 | Burson . |
| 4,161,726 | 7/1979 | Burson et al. . |
| 4,281,833 | 8/1981 | Sandler et al. . |
| 4,315,113 | 2/1982 | Fisher et al. . |
| 4,359,222 | 11/1982 | Smith, III et al. . |
| 4,469,330 | 9/1984 | Asher . |
| 4,485,457 | 11/1984 | Balaska et al. . |
| 4,538,035 | 8/1985 | Pool . |
| 4,552,360 | 11/1985 | Bromley et al. . |
| 4,575,591 | 3/1986 | Lugaresi . |
| 4,587,510 | 5/1986 | Kim . |
| 4,639,225 | 1/1987 | Washizuka . |
| 4,659,313 | 4/1987 | Kuster et al. . |
| 4,685,678 | 8/1987 | Frederiksen . |
| 4,748,441 | 5/1988 | Brzezinski . |
| 4,783,812 | 11/1988 | Kaneoka . |
| 4,789,932 | 12/1988 | Cutler et al. . |
| 4,799,677 | 1/1989 | Frederiksen . |
| 4,817,149 | 3/1989 | Myers . |
| 4,858,930 | 8/1989 | Sato . |
| 4,868,780 | 9/1989 | Stern . |
| 4,875,164 | 10/1989 | Monfort . |
| 4,887,230 | 12/1989 | Noguchi et al. . |
| 4,887,966 | 12/1989 | Gellerman . |
| 4,890,832 | 1/1990 | Komaki . |
| 4,916,440 | 4/1990 | Faeser et al. . |
| 4,924,216 | 5/1990 | Leung . |
| 4,926,372 | 5/1990 | Nakagawa . |
| 4,933,610 | 6/1990 | Wislocki . |
| 4,949,298 | 8/1990 | Nakanishi et al. . |
| 4,974,192 | 11/1990 | Face et al. . |
| 4,976,429 | 12/1990 | Nagel . |
| 4,976,435 | 12/1990 | Shatford et al. . |
| 4,984,193 | 1/1991 | Nakagawa . |
| 5,001,632 | 3/1991 | Hall-Tipping . |
| 5,012,230 | 4/1991 | Yasuda . |
| 5,014,982 | 5/1991 | Okada et al. . |
| 5,046,739 | 9/1991 | Reichow . |
| 5,052,685 | 10/1991 | Lowe et al. . |
| 5,095,798 | 3/1992 | Okada et al. . |
| 5,160,918 | 11/1992 | Saposnik et al. . |
| 5,203,563 | 4/1993 | Loper, III . |
| 5,207,426 | 5/1993 | Inoue et al. . |
| 5,213,327 | 5/1993 | Kitaue . |
| 5,226,136 | 7/1993 | Nakagawa . |
| 5,237,311 | 8/1993 | Mailey et al. . |
| 5,245,320 | 9/1993 | Bouton . |
| 5,259,626 | 11/1993 | Ho . |
| 5,273,294 | 12/1993 | Amanai . |
| 5,276,831 | 1/1994 | Nakanishi et al. . |
| 5,286,024 | 2/1994 | Winblad . |
| 5,290,034 | 3/1994 | Hineman . |
| 5,291,189 | 3/1994 | Otake et al. . |
| 5,317,714 | 5/1994 | Nakagawa et al. . |
| 5,327,158 | 7/1994 | Takahashi et al. . |
| 5,329,276 | 7/1994 | Hirabayashi . |
| 5,337,069 | 8/1994 | Otake et al. . |
| 5,357,604 | 10/1994 | San et al. . |
| 5,358,259 | 10/1994 | Best . |
| 5,371,512 | 12/1994 | Otake et al. . |
| 5,388,841 | 2/1995 | San et al. . |
| 5,388,990 | 2/1995 | Beckman . |
| 5,390,937 | 2/1995 | Sakaguchi et al. . |
| 5,393,070 | 2/1995 | Best . |
| 5,393,071 | 2/1995 | Best . |
| 5,393,072 | 2/1995 | Best . |
| 5,393,073 | 2/1995 | Best . |
| 5,394,168 | 2/1995 | Smith, III et al. . |
| 5,415,549 | 5/1995 | Logg . |
| 5,421,590 | 6/1995 | Robbins . |
| 5,426,763 | 6/1995 | Okada . |
| 5,436,640 | 7/1995 | Reeves . |
| 5,437,464 | 8/1995 | Terasima et al. . |
| 5,451,053 | 9/1995 | Garrido . |
| 5,453,763 | 9/1995 | Nakagawa et al. . |
| 5,459,487 | 10/1995 | Bouton . |
| 5,473,325 | 12/1995 | McAlindon . |
| 5,512,920 | 4/1996 | Gibson . |
| 5,513,307 | 4/1996 | Naka et al. . |
| 5,515,044 | 5/1996 | Glatt . |
| 5,551,693 | 9/1996 | Goto et al. . |
| 5,551,701 | 9/1996 | Bouton et al. . |
| 5,558,329 | 9/1996 | Liu . |
| 5,563,629 | 10/1996 | Caprara . |
| 5,566,280 | 10/1996 | Fukui et al. . |
| 5,577,735 | 11/1996 | Reed et al. . |
| 5,589,854 | 12/1996 | Tsai . |
| 5,593,350 | 1/1997 | Bouton et al. . |
| 5,607,157 | 3/1997 | Nagashima . |
| 5,615,083 | 3/1997 | Burnett . |
| 5,624,117 | 4/1997 | Ohkubo et al. . |
| 5,628,686 | 5/1997 | Svancarek et al. . |
| 5,632,680 | 5/1997 | Chung . |
| 5,640,177 | 6/1997 | Hsu . |
| 5,643,087 | 7/1997 | Marcus et al. . |
| 5,649,862 | 7/1997 | Sakaguchi et al. . |
| 5,653,637 | 8/1997 | Tai . |
| 5,663,747 | 9/1997 | Shulman . |
| 5,670,955 | 9/1997 | Thorne, III et al. . |
| 5,680,534 | 10/1997 | Yamato et al. . |
| 5,684,512 | 11/1997 | Schoch et al. . |
| 5,691,898 | 11/1997 | Rosenberg et al. . |
| 5,704,837 | 1/1998 | Iwasaki et al. . |
| 5,706,029 | 1/1998 | Tai . |
| 5,714,981 | 2/1998 | Scott-Jackson et al. . |
| 5,724,497 | 3/1998 | San et al. . |
| 5,731,806 | 3/1998 | Harrow et al. . |
| 5,734,373 | 3/1998 | Rosenberg et al. . |
| 5,734,376 | 3/1998 | Hsien . |
| 5,734,807 | 3/1998 | Sumi ................................ 395/127 |
| 5,759,100 | 6/1998 | Nakanishi . |
| 5,769,719 | 6/1998 | Hsu . |
| 5,784,051 | 7/1998 | Harrow et al. . |
| 5,785,597 | 7/1998 | Shinohara . |
| 5,786,807 | 7/1998 | Couch et al. . |
| 5,791,994 | 8/1998 | Hirano et al. . |
| 5,793,356 | 8/1998 | Svancarek et al. . |
| 5,804,781 | 9/1998 | Okabe . |
| 5,808,591 | 9/1998 | Mantani . |
| 5,816,921 | 10/1998 | Hosokawa . |
| 5,820,462 | 10/1998 | Yokoi et al. . |
| 5,830,066 | 11/1998 | Goden et al. ...................... 463/33 |
| 5,838,330 | 11/1998 | Ajima . |
| 5,850,230 | 12/1998 | San et al. . |
| 5,862,229 | 1/1999 | Shimizu . |
| 5,867,051 | 2/1999 | Liu . |
| 5,877,749 | 2/1999 | Shiga et al. . |
| 5,880,709 | 3/1999 | Itai et al. ........................ 345/113 |
| 5,896,125 | 4/1999 | Niedzwiecki . |
| 5,898,424 | 4/1999 | Flannery . |
| 5,946,004 | 8/1999 | Kitamura et al. . |
| 5,973,704 | 10/1999 | Nishiumi et al. . |
| 6,001,015 | 12/1999 | Nishiumi et al. . |
| 6,007,428 | 12/1999 | Nishiumi et al. . |
| 6,017,271 | 1/2000 | Miyamoto et al. .................... 463/31 |

| | | |
|---|---|---|
| 6,020,876 | 2/2000 | Rosenberg et al. . |
| 6,022,274 | 2/2000 | Takeda et al. . |
| 6,034,669 | 3/2000 | Chiang et al. . |
| 6,036,495 | 3/2000 | Marcus et al. . |
| 6,042,478 | 3/2000 | Ng . |
| 6,050,896 | 4/2000 | Hanado et al. .................. 463/32 |
| 6,071,194 | 6/2000 | Sanderson et al. . |
| 6,078,329 | 6/2000 | Umeki et al. .................. 345/419 |
| B1 4,870,389 | 6/1997 | Ishiwata et al. . |

FOREIGN PATENT DOCUMENTS

| | | |
|---|---|---|
| 553 532 | 8/1993 | (EP) . |
| 685 246 | 12/1995 | (EP) . |
| 724 220 | 7/1996 | (EP) . |
| 2234575 | 2/1991 | (GB) . |
| 2 244 546 | 12/1991 | (GB) . |
| 2 263 802 | 8/1993 | (GB) . |
| 50-22475 | 3/1975 | (JP) . |
| 57-18236 | 1/1982 | (JP) . |
| 57-2084 | 1/1982 | (JP) . |
| 57-136217 | 8/1982 | (JP) . |
| 59-40258 | 3/1984 | (JP) . |
| 59-121500 | 7/1984 | (JP) . |
| 61-16641 | 1/1986 | (JP) . |
| 61-198286 | 9/1986 | (JP) . |
| 61-185138 | 11/1986 | (JP) . |
| 2-41342 | 3/1990 | (JP) . |
| 2-68404 | 5/1990 | (JP) . |
| 2-283390 | 11/1990 | (JP) . |
| 3-16620 | 1/1991 | (JP) . |
| 3-248215 | 11/1991 | (JP) . |
| 4-26432 | 1/1992 | (JP) . |
| 4-20134 | 2/1992 | (JP) . |
| 4-42029 | 2/1992 | (JP) . |
| 4-104893 | 9/1992 | (JP) . |
| 4-291468 | 10/1992 | (JP) . |
| 5-100759 | 4/1993 | (JP) . |
| 5-19925 | 5/1993 | (JP) . |
| 5-177057 | 7/1993 | (JP) . |
| 5-241502 | 9/1993 | (JP) . |
| 6-23148 | 2/1994 | (JP) . |
| 6-54962 | 3/1994 | (JP) . |
| 6-68238 | 3/1994 | (JP) . |
| 6-110602 | 4/1994 | (JP) . |
| 6-114683 | 4/1994 | (JP) . |
| 6-190145 | 7/1994 | (JP) . |
| 6-190147 | 7/1994 | (JP) . |
| 6-205010 | 7/1994 | (JP) . |
| 6-61390 | 8/1994 | (JP) . |
| 6-285259 | 10/1994 | (JP) . |
| 6-315095 | 11/1994 | (JP) . |
| 07068052 | 3/1995 | (JP) . |
| 07088252 | 4/1995 | (JP) . |
| 7-104930 | 4/1995 | (JP) . |
| 7-144069 | 6/1995 | (JP) . |
| 7-222865 | 8/1995 | (JP) . |
| 7-288006 | 10/1995 | (JP) . |
| 7-317230 | 12/1995 | (JP) . |
| 8-45392 | 2/1996 | (JP) . |
| 9-56927 | 3/1997 | (JP) . |
| 62-269221 | 11/1997 | (JP) . |
| WO 92/09347 | 6/1992 | (WO) . |
| WO 94/12999 | 6/1994 | (WO) . |
| WO97/17651 | 5/1997 | (WO) . |
| WO97/32641 | 12/1997 | (WO) . |

OTHER PUBLICATIONS

Super Mario 64 Player's Guide, Nintendo of America, 1996.

Nintendo Power, "The Fun Machine" for Nintendo 64.

Nintendo Power, vol. 80, pp. 20–27, Jan. 1996.

*Nintendo Employee Shosinkai Reports*, 14 pages, Nov. 24–26, 1995.

Sega Force, Saturn Peripherals, Data Information, 1997–99.

Sega Force, Saturn Tech Specs, Data Information, 1997.

"Hardware Reset With Microcode Warning Period", *IBM Technical Disclosure Bulletin*, vol. 33, No. 11, Apr. 1991, pp. 105–106.

*3D Ballz Instruction Booklet*, Accolade, San Jose, California, #3050–00231 Rev. A.

6 Photographs of Sony Playstation: 1) top case and compact disk; 2) hand controller; 3) internal circuit boards (top view); 4) internal circuit boards (top view); 5) compact disk reader (bottom view); and internal main circuit board (bottom view).

*Knuckles Chaotix Instruction Manual*, Sega, Redwood City, California, #84503 (1995).

*Nintendo Power*, vol. 30, p. 22, PilotWings article.

*Nintendo Power*, vol. 31, p. 35, PilotWings article.

*Nintendo Power*, vol. 31, pp. 74–76, PilotWings article.

*Nintendo Power*, vol. 38, p. 25, PilotWings article.

*Nintendo Power*, vol. 46, PilotWings article.

*PilotWings Instruction Booklet*, Super Nintendo Entertainment System, SNS–PW–USA, copyright 1991.

*PilotWings, It's a Festival of Flight*, Top Secret Password Nintendo Player's Guide, pp. 82–83 and 160, copyright 1991.

*PilotWings, Soar with the Flight Club*, Super Nintendo Entertainment System Play's Guide, pp. 100–105, copyright 1991.

*Sega Genesis 32X Instruction Manual*, Sega, Redwood City California, #672–2116 (1994).

*Sega Genesis Instruction Manual*, Sega, Hayward, California, #3701–926–0–01 (1994).

*Sonic 2 The Hedgehog Instruction Manual*, Sega, Hayward, California, #672–0944 3701–925–0–01 (1992).

Sony Play Station Instruction Manual, and informational materials, Sony Computer Entertainment Inc. 1995.

"Analog Joystick Interface Emulation Using a Digital Counter", IBM technical Disclosure Bulletin, vol. 37, No. 08, Aug. 1994, pp. 73–74.

COMMAND 0: SEND CONTROLLER TYPE

COMMAND 1: ACCESS REFERENCE CONTROLLER

* JSRST BECOMES H1 WHEN L, R AND START BUTTONS ARE SIMULTANEOUSLY PRESSED.

COMMAND 2: READ RAM

FIG. 19

COMMAND 3 : WRITE RAM

RECEIVE: 35 BYTES   SEND: 1 BYTE
DATA ITEMIZATION

|  |  | d7 | d6 | d5 | d4 | d3 | d2 | d1 | d0 |
|---|---|---|---|---|---|---|---|---|---|
| RECEIVE | 1 BYTE | ←———————— COMMAND 3 ————————→ ||||||||
|  | 2 BYTE | ←———————— ADDRESS H ————————→ ||||||||
|  | 3 BYTE | ←—— ADDRESS L ——→ | ←———— ADDRESS CRC ————→ |||||||
|  | 4 BYTE | ←———————— DATA 0 ————————→ ||||||||
|  | 5 BYTE | ←———————— DATA 1 ————————→ ||||||||
|  | ⋮ | ⋮ ||||||||
|  | 35 BYTE | ←———————— DATA 31 ————————→ ||||||||
| SEND | 1 BYTE | ←———————— DATA CRC ————————→ ||||||||

FIG. 20

COMMAND 255 : SEND CONTROLLER TYPE

RECEIVE: 1 BYTE   SEND: 3 BYTES

|  |  | d7 | d6 | d5 | d4 | d3 | d2 | d1 | d0 |
|---|---|---|---|---|---|---|---|---|---|
| RECEIVE | 1 BYTE | ←———————— COMMAND 255 ————————→ ||||||||
| SEND | 1 BYTE | ←———————— TYPE L ————————→ ||||||||
|  | 2 BYTE | ←———————— TYPE H ————————→ ||||||||
|  | 3 BYTE | ←———————— STATUS ————————→ ||||||||

JOY STICK PHYSICAL COORDINATES

DISPLAY SCREEN

JOY STICK PHYSICAL COORDINATES

DISPLAY SCREEN

OPERATION CONTROLLING DEVICE AND VIDEO PROCESSING SYSTEM USED THEREWITH

This is a continuation of application Ser. No.08/719,019 filed Sep. 24, 1996 (now U.S. Pat. No. 6,001,015).

FIELD OF THE INVENTION

This invention relates to an operation controlling device. More specifically, this invention relates to an operation controlling device (such as a video game controller having a joystick) with expandable functions which is able to send and receive diverse kinds of data to and from a video processing device such as a personal computer or video game device.

BACKGROUND OF THE INVENTION

Prior art joysticks mechanisms detect how much an operation member is tilted and in which direction. The condition of the operation member free standing in the center, when not being touched by an operator's hand serves as the point of origin.

Such prior art devices have fixed conditions of use for the operation members because their points of origin are fixed. Because of this, the point of origin can not be freely determined by the user.

In accordance with one aspect of the present invention, an operation controlling device is described with which errors due to mass production can be easily corrected, and the point of origin can be freely determined by the user.

In an exemplary embodiment of the present invention, the operation controlling device is coupled to a video display generating device for generating video data to be displayed on a display unit under the control of a stored program. The operation controlling device supplies signals, in response to an operator's manipulations, to change the video data generated by the video processing device. The exemplary embodiment operation controlling device is equipped with a movable operation member, rotor bodies, rotation detection mechanisms, counting circuitry, reset signal generation circuitry and data transfer circuitry. The operation controlling device also may include a connector port for interconnecting an expansion device such as a memory card to the video processing system.

The operation member is manipulated and tilted by the operator within a desired range, and is supported so that it stops at a desired position when not being manipulated by the operator. The rotor bodies rotate according to the operation member tilt amount. The rotation detection mechanisms detect the rotated condition of the rotor bodies. The counting circuitry count values change according to the rotation amounts of the rotor bodies detected by the rotation detection mechanisms. The reset signal generation circuitry generates reset signals to reset the count values. The transfer circuitry transfers the count values generated by the counting circuitry to the video processing device.

The present invention is also directed to a video processing system including a video processing device which generates a sequence of video display frames on a display unit under the control of a stored program, and a unique operation controlling device which is connected to the video processing device and which supplies signals in response to an operator's manipulation, to change the video data generated by the video processing device. The video processing device includes a replaceable program memory, first data receiving circuitry, a central processing unit, first data sending circuitry and a video signal generation circuitry. The operation controlling device is preferably the unique controller described in detail herein and may include various operation controlling buttons, switches, an operation member, rotor bodies, rotation detection mechanisms, counting circuitry, reset signal generation circuitry, second receiving circuitry, transfer circuitry and second sending circuitry.

Many unique modes of video game operation and special videographic effects are possible with the operation controlling mechanism and video processing system described herein. For example, the operation controlling mechanism may be advantageously utilized to permit user control of a displayed object via said operation member and at the same time independently control movement of another displayed object via control switches protruding from the operation controlling mechanism housing.

The replaceable program memory stores the video processing program. The processing device's first data receiving circuitry receives data generated by the operation controlling device. The central processing unit generates command data according to the program stored in program memory and generates video data according to the data received by the first receiving circuitry. The first data sending circuitry sends command data generated by the central processing unit to the operation controlling device. The video signal generation circuitry generates the video signals for displaying the video display frame images on the display unit according to the video data from the central processing unit.

The operation member is manipulated and tilted by the operator within a desired range, and is supported so that it stops at a desired position when not being manipulated by the operator. The rotor bodies rotate according to the tilt amount of the operation member. The rotation detection circuitry detects the rotated condition of the rotor bodies. Counting circuitry count values change according to the rotation amount of the rotor bodies detected by the rotation detection circuitry. Reset signal generation circuitry generates reset signals to reset the count values of the counting circuitry. The operation controlling device's second receiving circuitry receives command data transmitted from the processing device's first sending circuitry. Transfer circuitry outputs count value data which have been counted by the counting circuitry in response to command data received by the operation controlling device's second receiving circuitry. The second sending circuitry transmits the count value data output by the transfer circuitry to the video processing device. The video processing device then generates video signals to display the video image which has been changed according to those count values.

Many advantages flow from the origin resetting and other unique aspects of the present invention. As described in detail herein, unique video games effects and modes of operations are advantageously implemented. For example, with respect to the origin resetting feature, since the origin can be freely determined in all directions by the user, the device is readily adaptable and easy to operate according to the individual operator's preference. Since the operator cannot determine the origin except by simultaneously depressing several buttons, erroneous operator initiated origin changes are significantly diminished.

When the origin is set outside the center of the operation member, after the operation member is tilted by the operator, the operation member returns to a position outside the origin when the operator's hand is removed. Because of this, if the origin is reset so that the position when the operator's hand is removed is at a desired coordinate position, a displayed object can be positioned so that it easily returns to the desired coordinate position even after the operation member has been moved in a complex fashion. For example, if the operation member is reset while it is tilted to the right, the operation member can be moved to coordinates far to the left without having to traverse a lengthy set of rightward coordinates to display an object at a desired rightward position. This feature may be advantageously employed, for example, in various video games to rapidly displace a weapon sight to a predicted enemy position.

The origin also can be determined according to commands from the video processing device. Consequently, it is possible to determine the origin from outside the operation device at any desired time during program execution.

The aforementioned operational description and other purposes, characteristics and advantages of this invention will become even clearer from a detailed explanation of an exemplary implementation in conjunction with the attached figures.

BRIEF DESCRIPTION OF THE DRAWINGS

FIG. 19 is a table showing the data sent to and from the control circuit 442 when command 3 has been sent from the controller control circuit 17;

FIG. 20 is a table showing the data sent to and from the control circuit 443 when command 255 has been sent from the controller control circuit 17;

FIG. 22 is a flowchart for the operation to reset the X counter 444X and Y counter 444Y when the power is turned ON;

DETAILED DESCRIPTION OF THE DRAWINGS

Figure 1:
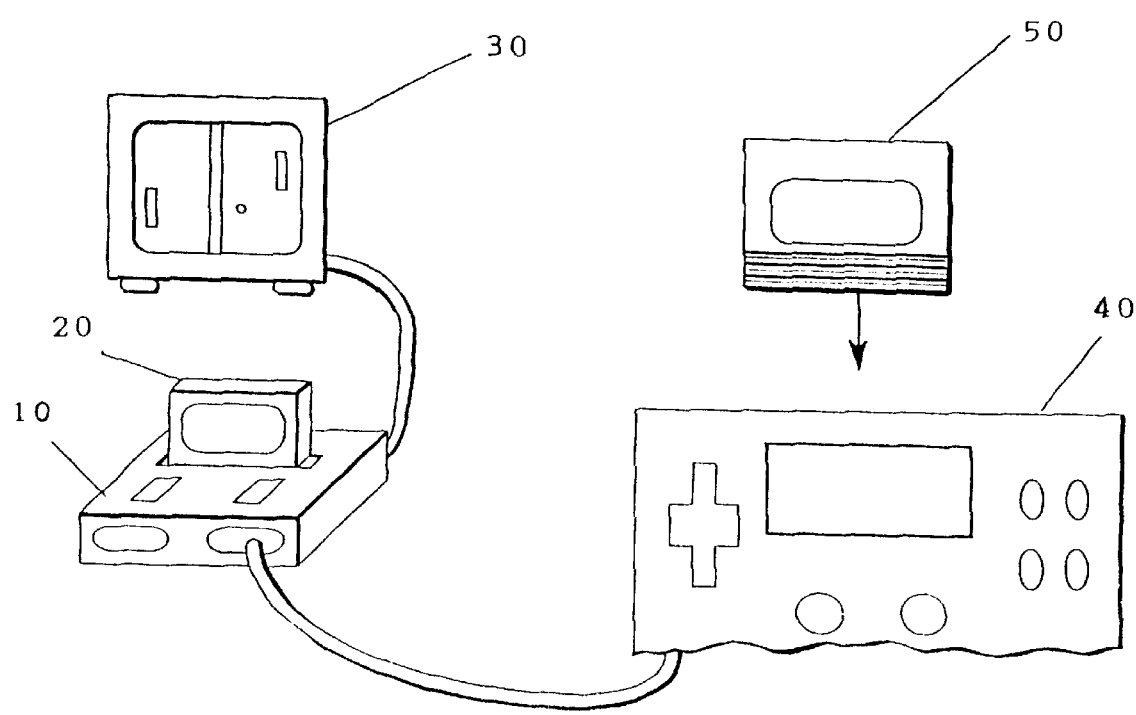
FIG. 1 is an external view of an exemplary video processing system.

FIG. 1 depicts an exemplary system implementation of a video processing device 10 and controller 40 in accordance with the present invention. An illustrative video processing device 10 and system for use with the particular controllers described herein is the Nintendo 64 which is disclosed in copending application Ser. No. 08/562,288 entitled "High Performance/Low Cost Video Game System With Multifunctional Peripheral Processing Subsystem", which application is incorporated herein by reference. The video processing device 10 has a connector situated in its top, into which a cartridge 20 is inserted. The cartridge houses a printed circuit board which can be electrically connected with the video processing device 10 by being connected to the FIG. 2 cartridge connector 13 to permit the cartridge to transmit and receive data. An external ROM device, which stores data and programs, etc., and, if desired, a read/write memory device, such as a RAM, are mounted on this board to store program instructions and data processed by the video processing device 10.

Figure 2:
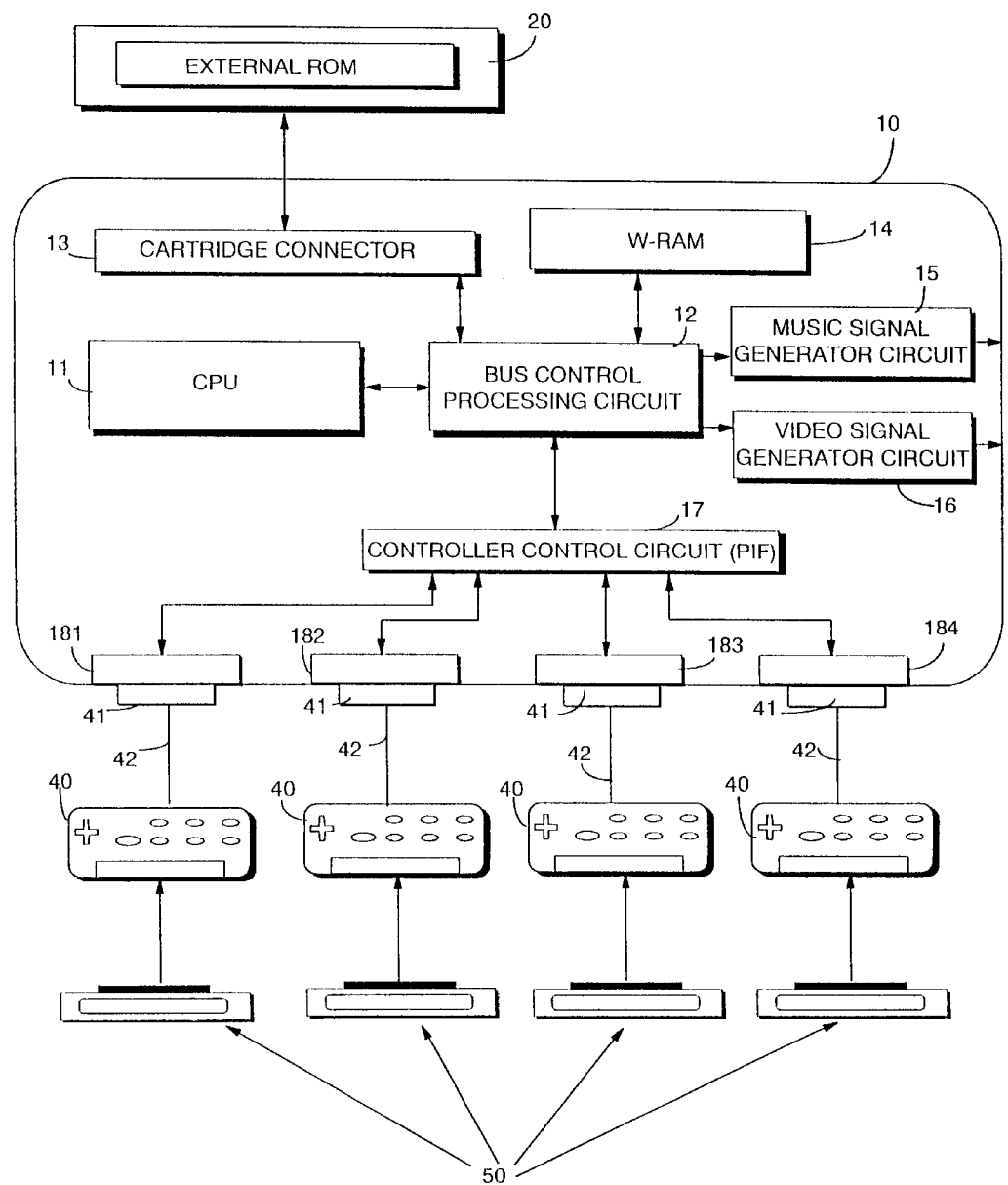
FIG. 2 is a block diagram of the video processing device 10 and controllers.

As shown in FIG. 2, controller connectors 181–184 are situated on the front surface of the video processing device 10 for connecting up to four controllers 40. By coupling a controller 40 to a controller connector 181–184, the video processing device 10 is electrically connected with the controller 40, making it possible to send and receive data to and from the controller 40. The controller 40 is coupled by a cable 42 to a connection jack 41 for the purpose of connecting to controller connector 181–184 situated in the video processing device 10. The controller 40 is shaped so that it can be grasped by one or both hands, and includes a vertically upright operation member and various control and data entry buttons, which are described below, and which generate electrical signals by being pressed.

Referring to the FIG. 2 exemplary block schematic, the video processing device 10 and cartridge 20 are, in use, coupled to display unit 30 (television receiver or CRT, etc.) as shown in FIG. 1. The cartridge 20, display unit 30 and controllers 40 are connected to the chassis of the video processing device 10. The cartridge 20 is connected to the cartridge connector 13, for connecting the external ROM and read/write memory inside the cartridge 20 to a bus control processing circuit 12 via an address bus and a data bus, enabling the exchange of data. The video processing device 10 includes a CPU 11 for controlling video processing according to a program which is stored in the external memory built into the cartridge 20 which is inserted into video processing device 10. The CPU 11 may, for example, be a RISC microprocessor such as the MIPS 4300 RISC microprocessor. An exemplary CPU 11 memory map shows an external memory in FIG. 3 which includes a video data area 201, in which video data required for the video processing device 10 to generate the video signals are stored, and a program data area 202, in which the program data required for the CPU 11 to perform the desired operations are stored. The CPU address space also includes a control pad data area 141 embodied within a work RAM address area which may be part of a main memory address space. In addition, various bus control processing circuit 12 registers, controller control circuit 17 memory devices, etc., are mapped into the main processor address space.

In an exemplary embodiment of the present invention, a bus control processing circuit 12 also is connected to CPU 11. The bus control processing circuit 12 is connected by a parallel bus to the cartridge connector 13, W-RAM 14, a music signal generation circuit 15 and a video signal generation circuit 16, and is connected by a serial link to a controller control circuit 17. The bus control processing circuit 12 inputs commands output as parallel signals from the CPU 11 via the bus, performs parallel/serial conversion, outputs commands as serial signals to the controller control circuit 17, and converts the serial signal data input from the controller control circuit 17 into parallel signals and outputs such signals to the bus. As described in the above identified incorporated application, the bus control processing circuit (coprocessor 200 therein) may perform a wide range of graphics processing functions in addition to the controller related and other processing functions described herein. The bus control processing unit is a coprocessor which cooperates with CPU 11 to execute the video game/videographics program stored in the removable memory media. The controller 40 data which has been output to the bus control processing unit is appropriately processed, e.g., by the CPU 11, or is stored in WRAM 14. Videographics processing within video processing device 10 may take place in accordance with above identified copending application Ser. No. 08/562,288, which has been incorporated herein by reference.

Figure 3:
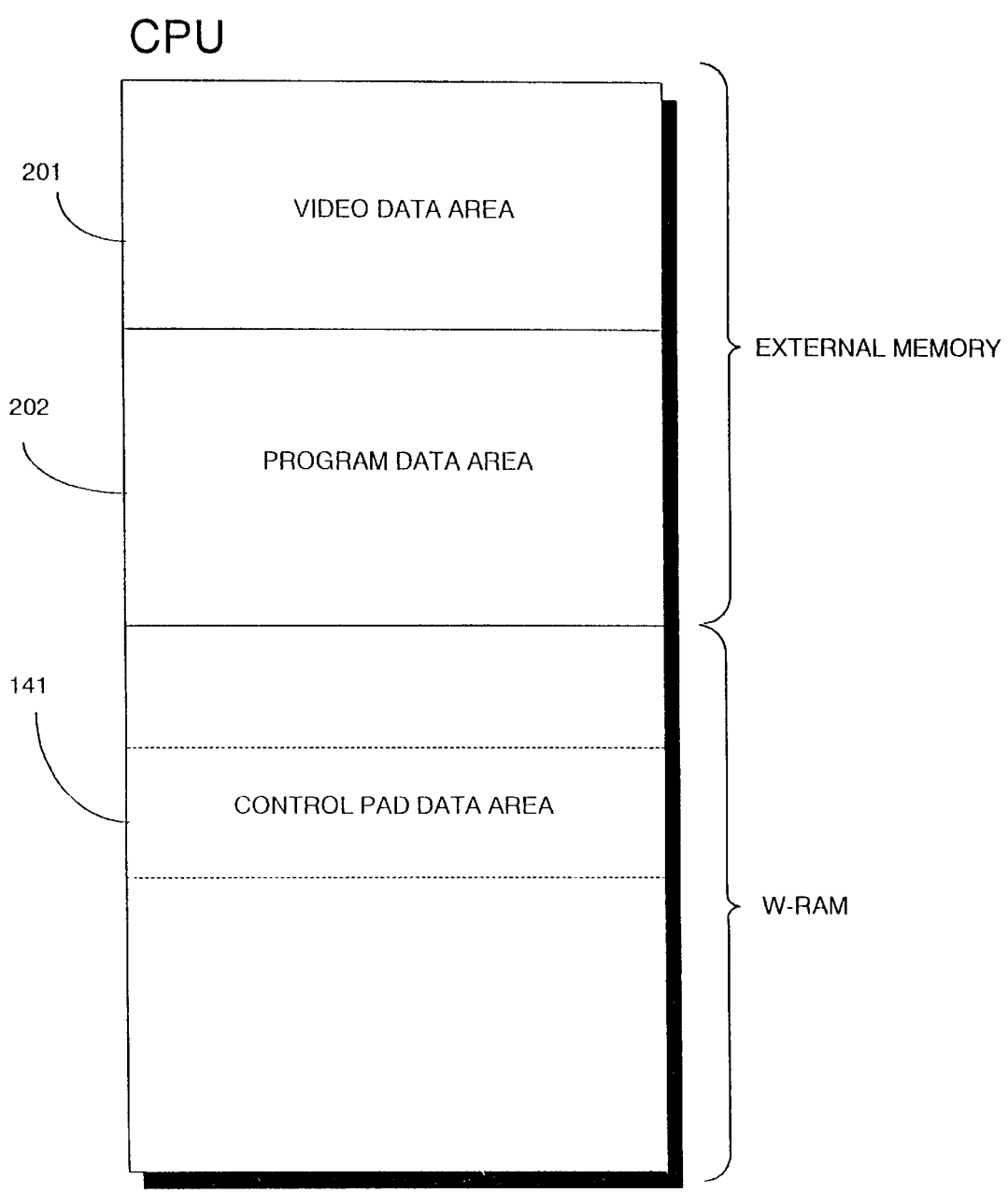
FIG. 3 is an exemplary memory map of the CPU 11 address space showing the external memory and W-RAM 14.

The W-RAM device 14 is the memory for temporarily storing data for processing by CPU 11, and is connected with the bus control processing circuit 12 via an address bus and a data bus, making it possible for data to be read and written via the bus control processing circuit. An exemplary memory map of the W-RAM 14 is shown in FIG. 3 as including a control pad data area. The W-RAM 14 may be part of the CPU 11 main memory which may be of the type shown in the above-identified copending application Ser. No. 08/562,288.

The music signal generation device 15 is a circuit which generates a music signal according to commands from the CPU 11 via the bus control processing circuit 12. The video signal generation device 16 is a circuit which generates a video signal according to commands from the CPU 11 via the bus control processing circuit 12.

Figure 4:
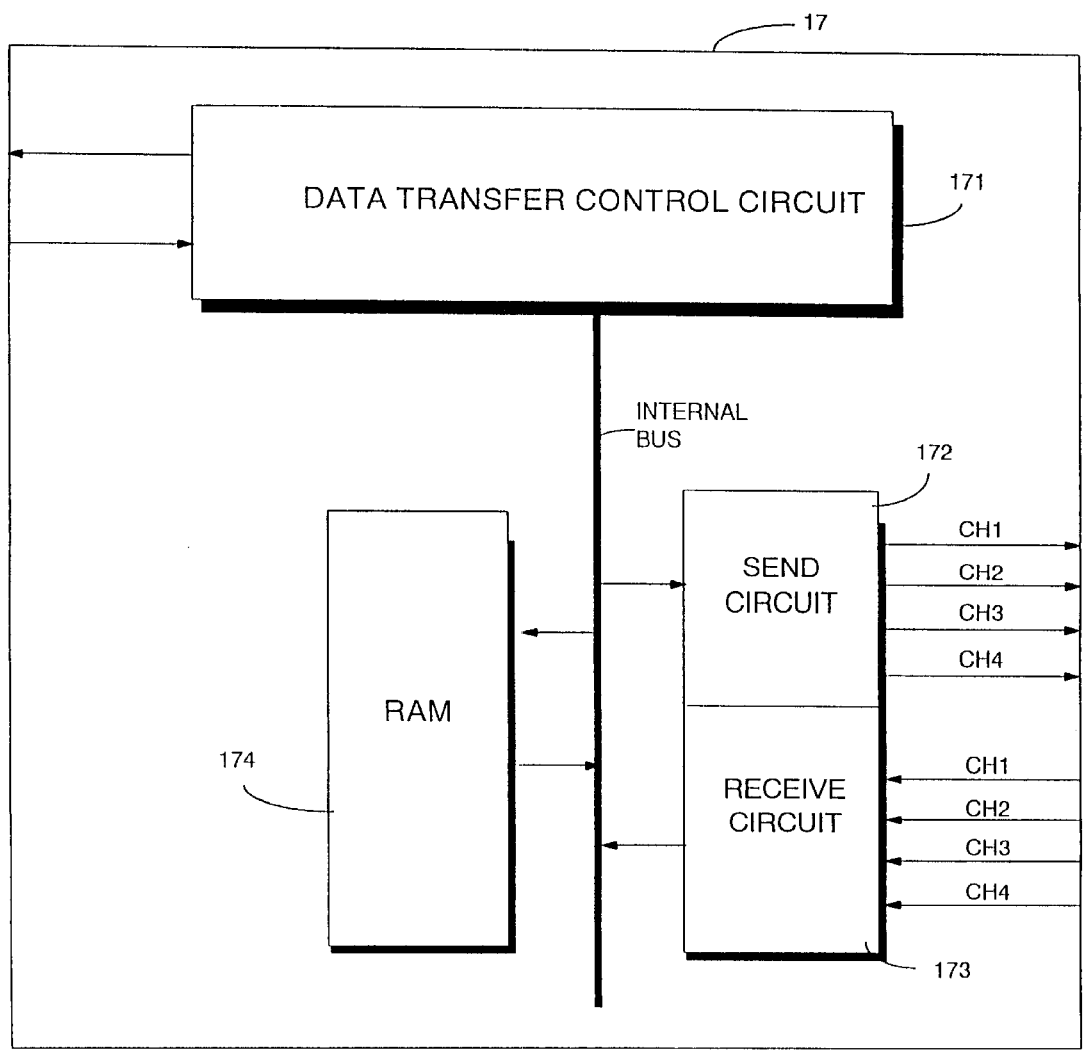
FIG. 4 is a block diagram of the controller control circuit 17 of FIG. 2.

The controller control circuit 17 sends and receives serial data to and from the bus control processing circuit 12 and the controller connectors 181–184. FIG. 4 shows an exemplary controller control circuit 17 which includes a data transfer control circuit 171. Data transfer control circuit 171 includes a parallel/serial converter circuit and a serial/parallel converter circuit for receiving serial data from the bus control processing circuit 12 via the serial/parallel converter circuit. In addition, data transfer control circuit 171 is connected to a send circuit 172, receive circuit 173 and the RAM 174 via an internal bus. The data transfer control circuit 171 is able to send and receive data as a parallel signal over the internal bus. Consequently, the data transfer control circuit 171 is able, based on commands from the bus control processing circuit 12, to read the data in RAM 174 and send it to the bus control processing circuit 12, and to receive data from the bus control processing circuit 12 and write it to RAM 174 as explained in detail in copending application Ser. No. 08/562,288.

The send circuit 172 converts the parallel signals from the internal bus into serial signals and couples such signals to a selected channel CH1–CH4, which are connected to respective controller connectors 181–184, enabling serial signals to be sent to a respective controller 40.

The receive circuit 173 receives a serial signal from a controller 40 and outputs the received data as a parallel signal to the internal bus. The signal wires CH1–CH4 are each connected to respective controller connectors 181–184, enabling them to receive serial data from the respective controller 40 to which they are connected.

Figures 5, 10:
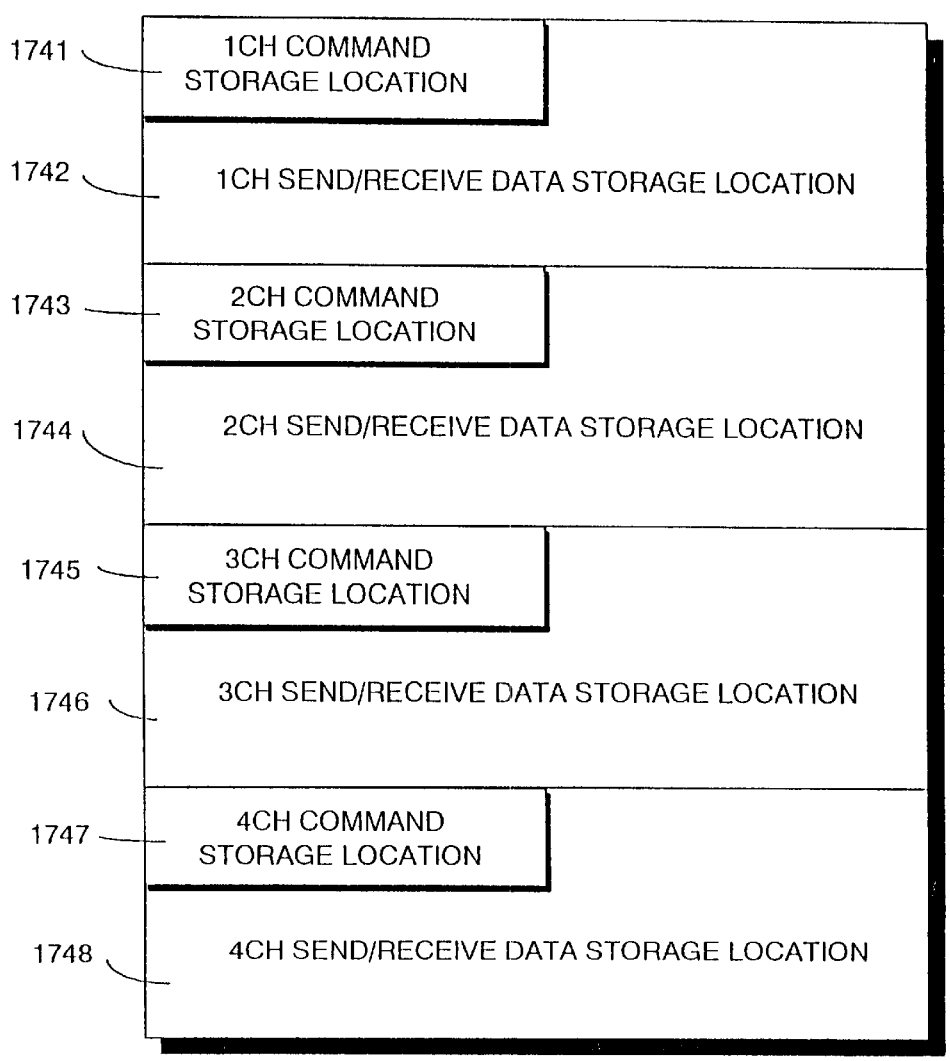
FIG. 5 is a memory map of the RAM device 174.
FIG. 10 is a data table for the controller joystick 45 and buttons 403 through 407.

The RAM 174 is connected to the data transfer control circuit 171 via the bus, enabling it to input and output parallel data. The data stored in RAM 174 is structured as explained in the FIG. 5 illustrative memory map. The channel 1 commands are stored in area 1741. The channel 1 send data and receive data are stored in area 1742. The channel 2 commands are stored in area 1743. The channel 2 send data and receive data are stored in area 1744. The channel 3 commands are stored in area 1745. The channel 3 send data and receive data are stored in area 1746. The channel 4 commands are stored in area 1747. The channel 4 send data and receive data are stored in area 1748.

Although FIG. 5 depicts four channels, there may be, for example, six channels available in accordance with the present exemplary embodiment. Each Channel's send (transmit) data and receive data byte sizes are all independently assignable by setting size parameters. In the exemplary embodiment, all channels size parameter setups are required, whether they are used or not. As shown in FIG. 5, RAM 174 is used for each channel's TxData/RxData assignment. TxData/RxData assignment becomes effective when main processor 11 sets a format flag by using a write to RAM 174 related command.

In the exemplary embodiment, if processor 11 writes "0x00", "0xFD", "0xFE" or "0xFF" as TxData Size, the data is not recognized as TxData size but has a special function as indicated below. They become effective when processor 11 sets a format bit by using a write to RAM 174 related command.

"0x00"=Channel Skip

If 0x00 is written as TxData Size, respective controller 40 Channel transaction is not executed.

"0xFD"=Channel Reset

If 0xFD is written as TxData Size, controller control circuit 17 outputs reset signal to respective controller 40 Channel.

"0xFE"=Format End

If 0xFE is written as TxData Size, TxData/RxData assignment, the TxData Size or RxData Size after "0xFE" is ignored.

"0xFF"=Dummy Data

TxData Size's 0xFF is used as the dummy data for word aligning the data area.

Each Channel has four flags. Two of them have information from processor 11 to controller 40 Channel and others from controller 40 Channel to processor 11.

Skip=Channel Skip

If processor 11 sets this flag to "1", respective controller 40 Channel transaction is not executed. This flag becomes effective without formal flag.

Res=Channel Reset

If CPU 11 set this flag to "1", controller control circuit 17 outputs reset signal to respective controller 40 Channel. This flag becomes effective without format flag.

NR=No Response to JoyChannel

When each controller 40 Channel's peripheral device does not respond, the respective NR bit is set to "1". This is the way to detect the number of currently connected peripheral devices.

Err=JoyChannel Error

When communication error has occurred between controller control circuit 17 and controller 40, Err flag is set to "1".

The data transfer control circuit 171 sends the desired command from the send circuit 172 and causes the receive circuit 173 to store received data in RAM 174. An exemplary implementation of the FIG. 4 controller control circuit 17 is described in further detail in the above identified incorporated application Ser. No. 08/562,288 (the peripheral interface or PIF therein).

The controller connectors 181–184 are connected by serial lines to the various controller control circuit 17 channel I/O lines, and are shaped so as to link with the connection jack 41 on each controller 40. When a controller connector 181–184 is connected with a controller 40 connection jack 41, it is electrically connected with the controller 40 so that data can be exchanged.

Figure 6:
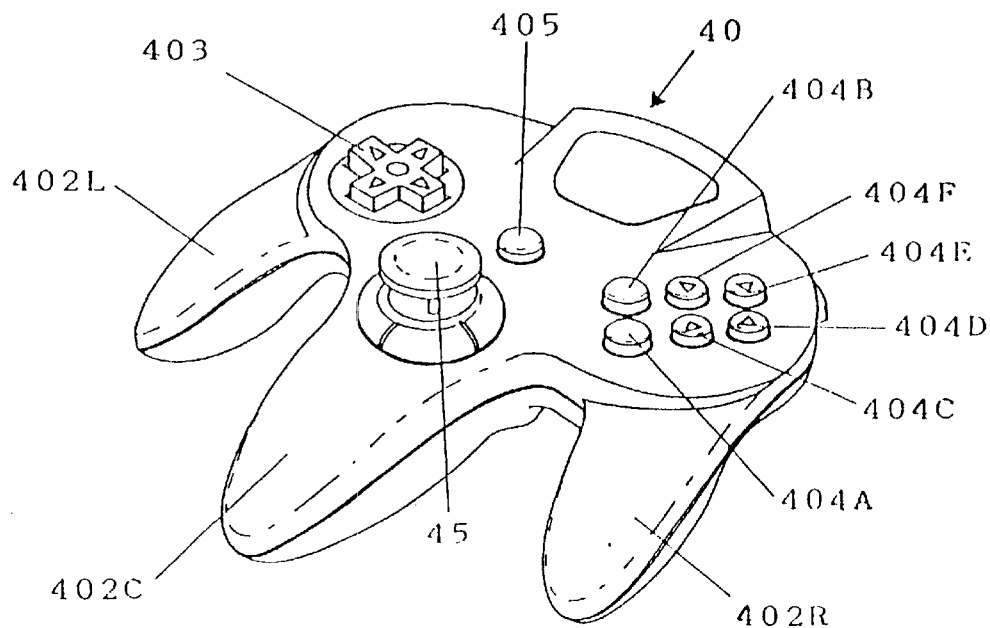
FIG. 6 is a perspective view of the controller 40 seen from above.
Figure 7:
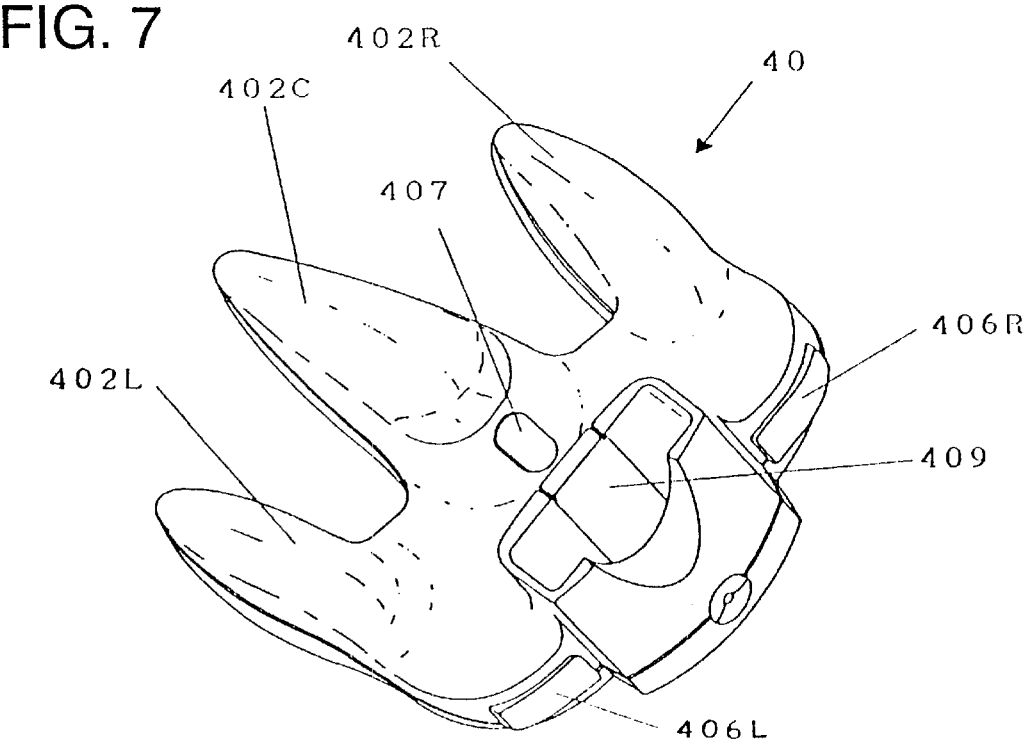
FIG. 7 is a perspective view of the controller 40 seen from below.

FIGS. 6 and 7 are external oblique-view drawings of a controller 40. The top housing of the controller 40 comprises an operation area in which a joystick 45 and buttons 403, 404A–F and 405 are situated adjacent 3 grips 402L, 402C and 402R. The bottom housing of the controller 40 comprises an operation area in which a button 407 is situated, 3 grips 402L, 402C and 402R and an expansion device mount 409. In addition, buttons 406L and 406R are situated at the boundary between the top housing and bottom housing of the controller 40. Furthermore, an electrical circuit, to be described below, is mounted inside the top and bottom housings. The electrical circuit is electrically connected to the video processing device 10 by cable 42 and connection jack 41. Button 403 may, for example, be a cross switch-type directional switch consisting of an up button, down button, left button and right button, which may be used to control the displayed position of a displayed moving object such as the well known Mario character. Buttons 404 consist of button 404A, button 404B, button 404C, button 404D, button 404E and button 404F, and can be used, for example, in a video game to fire missiles or for a multitude of other functions depending upon the game program. Button 405 is a start button and is used primarily when starting a desired program. As shown in FIG. 7, button 406L is situated so that it can be easily operated by the index finger of the left hand, and button 406R is situated so that it can be easily operated by the index finger of the right hand. Button 407 is situated on the bottom housing so that it cannot be seen by the operator. In addition, grip 402L is formed so that it is grasped by the left hand and grip 402R is formed so that it is grasped by the right hand. Grip 402C is situated for use when grip 402L and/or, grip 402R are not in use. The expansion device mount 409 is a cavity for connecting an expansion device to the joy port connector 46.

Figure 8:
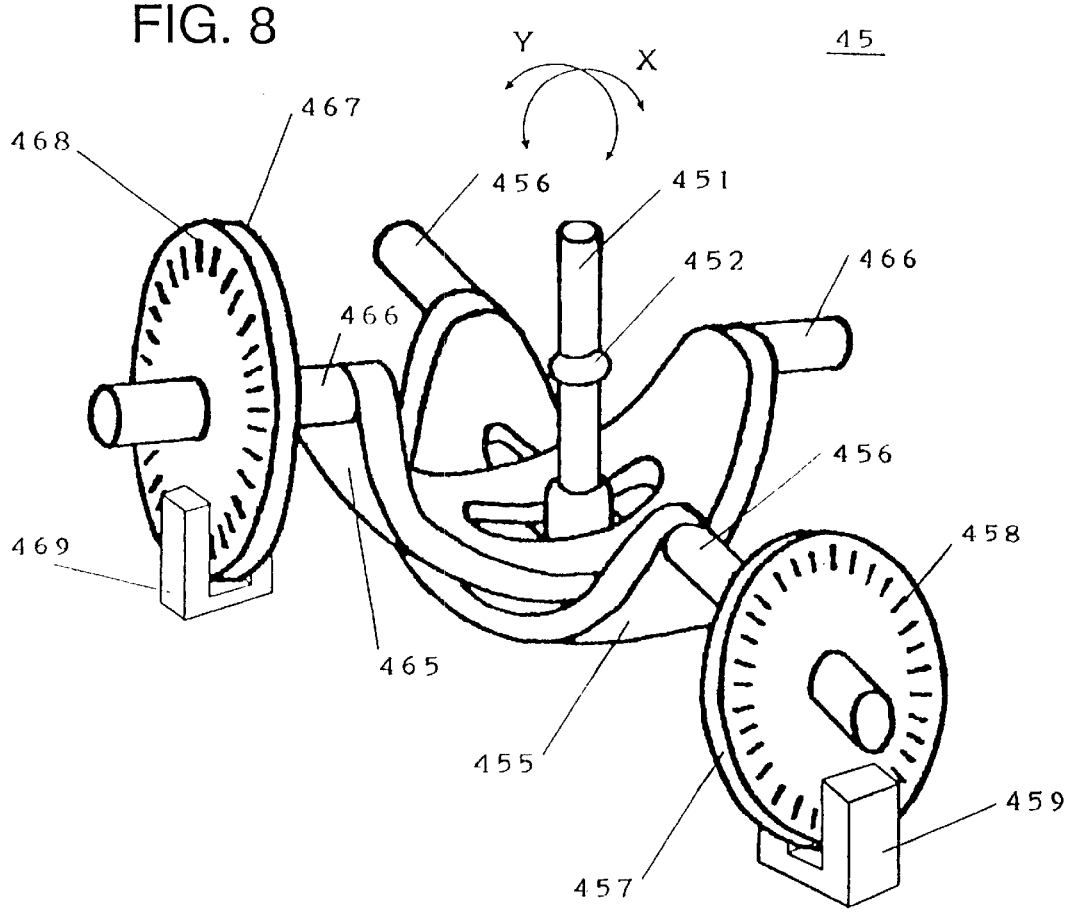
FIG. 8 is an internal structural drawing of the joystick 45.

The internal construction of the controller 40 joystick 45 is shown in FIG. 8. The tip of the operation member 451 protruding from the housing is formed into a disk which is easily manipulated by placing one's finger on it. The part below the disk of the operation member 451 is rodshaped and stands vertically when it is not being manipulated. In addition, a support point 452 is situated on the operation member 451. This support point 452 securely supports the operation member on the controller 40 housing so that it can be tilted in all directions relative to a plane. An X-axis linkage member 455 rotates centered around an X shaft 456 coupled with tilting of the operation member 451 in the X-direction. The X shaft 456 is axially supported by a bearing (not shown). A Y-axis linkage member 465 rotates centered around a Y shaft 466 coupled with tilting of the operation member 451 in the Y-direction. The Y shaft 466 is axially supported by a bearing (not shown). Additionally, force is exerted on the operation member 451 by a return member, such as a spring (not shown), so that it normally stands upright. Now, the operation member 451, support 452, X-axis linkage member 455, X shaft 456, Y-axis linkage member 465 and Y shaft 466 are also described in Japan Utility Patent Early Disclosure (Kokai) No. HEI 2-68404.

A disk member 457 is attached to the X shaft 456 which rotates according to the rotation of the X shaft 456. The disk member 457 has several slits 458 around the perimeter of its side at a constant distance from the center. These slits 458 are holes which penetrate the disk member 457 and make it possible for light to pass through. A photo-interrupter 459 is mounted to the controller 40 housing around a portion of the edge of the perimeter of the disk member 457, which photo-interrupter 459 detects the slits 458 and outputs a detection signal. This enables the rotated condition of the disk member 457 to be detected. A description of the Y shaft 466, disk member 467 and slits 468 are omitted since they are the same as the X shaft 456, disk member 457 and slits 458 described above.

The technique of detecting the rotation of the disc members 457 and 467 using light, which was described above, is disclosed in detail in Japan Patent Application Publication No. HEI 6-114683, filed by applicants' assignee in this matter, which is incorporated herein by reference.

In this exemplary implementation, disk member 457 is directly mounted on the X-axis linkage, member 455, but a gear could be attached to the X shaft 456 and the disc member 457 rotated by this gear. In such a case, it is possible to cause the disc member 457 to greatly rotate by the operator slightly tilting the operation member 451 by setting the gear ratio so that rotation of the disc member 457 is greater than rotation of the X shaft 456. This would make possible more accurate detection of the tilted condition of the operation member 451 since more of the slits 458 could be detected. For further details of the controller 40 joystick linkage elements, slit disks, optical sensors and other elements, reference is made to Japanese Application No. H7-317230 filed Nov. 10, 1995, which application is incorporated herein by reference.

Additionally, in the exemplary embodiment, a method for detecting the rotation of the disc members 457 and 467 is disclosed which detects the slits 458 and 468 using photo-interrupters 459 and 469, but any method could be used as long as it detects rotation of the disc members 457 and 467. For example, a method of detecting the disk members 457 and 467 rotation could be used in which several conductor members are situated on the disc members 457 and 467 and these conductor members are then electrically detected.

Figure 9:
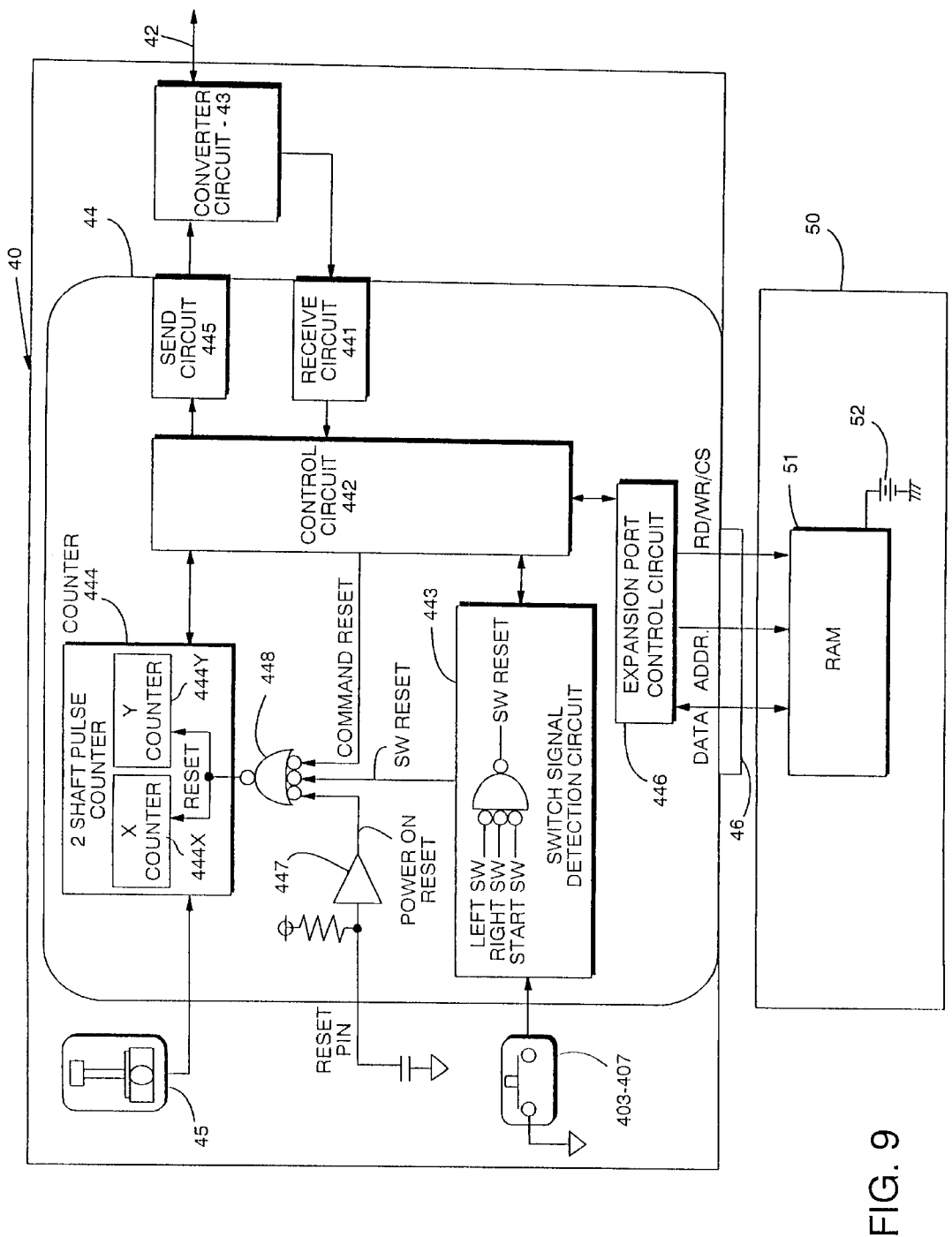
FIG. 9 is a detailed block diagram of the controller 40 and the expansion device 50.
Figure 11:
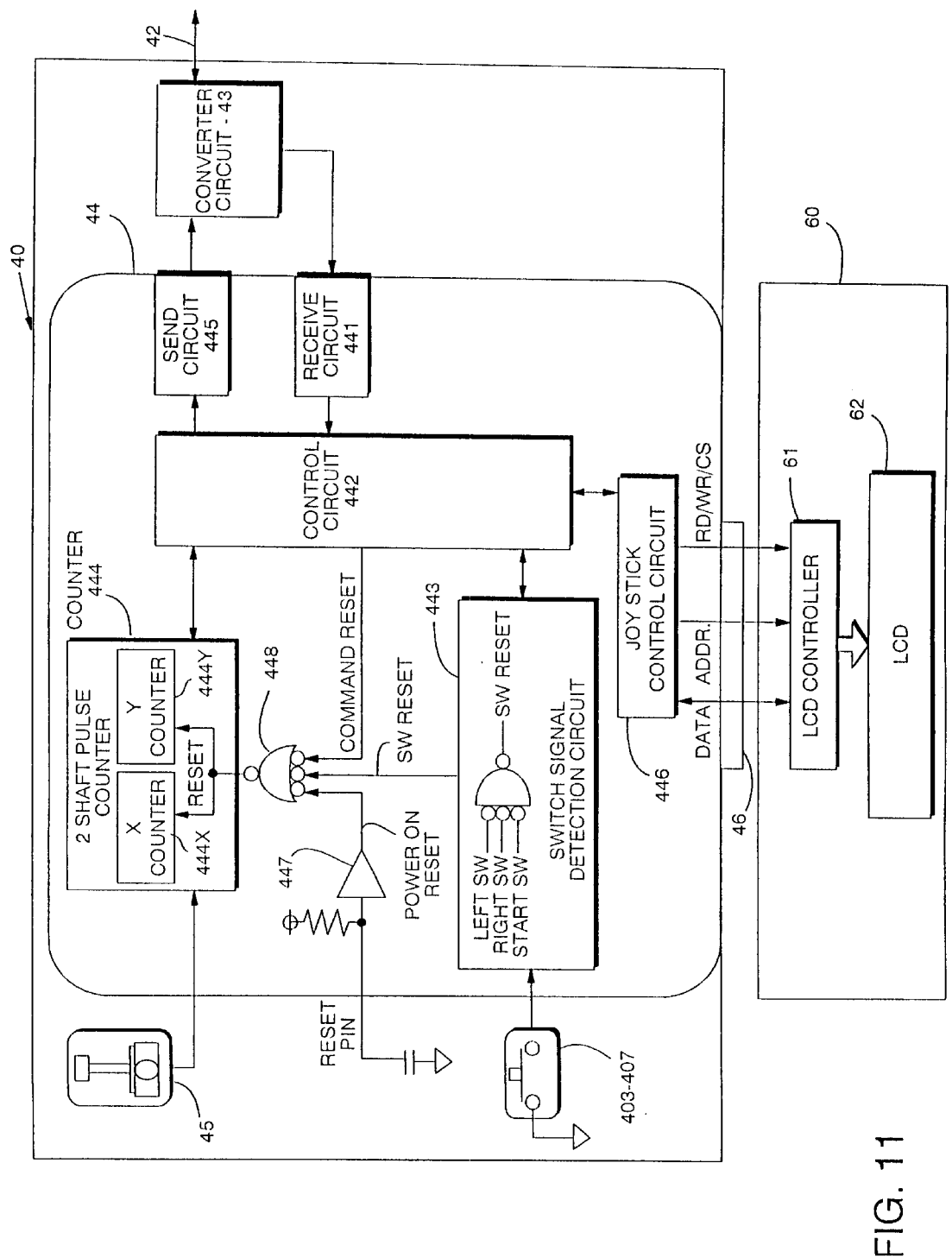
FIG. 11 is a detailed block diagram of the controller 40 and another exemplary expansion device 60.

Controller 40 which is connected to the FIG. 2 connector 181 is described using the detailed FIG. 9 block diagram. The remaining controllers 40 which are connected to the aforementioned controller connectors 182–184 are identical to controller 40 which is connected to controller connector 181. The FIG. 2 connection jack 41 is connected to the controller connector 181–184 so that data which has been transmitted from the video processing device 10 is output to a conversion circuit 43.

The conversion circuit 43 sends and receives data to and from the controller control circuit 17 in the video processing device 10 as a serial signal via cable 42. The conversion circuit 43 sends serial data received from the controller control circuit 17 as a serial signal to receiving circuit 441 inside the controller circuit 44. It also receives a serial signal from the send circuit 445 inside the controller circuit 44 and then outputs this signal as a serial signal to the controller control circuit 17 via cable 42.

The send circuit 445 converts the parallel signal which is output from the control circuit 442 into a serial signal and outputs the signal to conversion circuit 43. The receive circuit 441 converts the serial signal which has been output from converter circuit 43 into a parallel signal and outputs it to control circuit 442.

The send circuit 445, receive circuit 441, joy port control circuit 446, switch signal detection circuit 443 and counter 444 are connected to the control circuit 442. A parallel signal from receive circuit 441 is input to control circuit 442, whereby it receives the data/command information which has been output from video processing device 10. The control circuit 442 performs the desired operation based on such received data. The control circuit 442 instructs the switch signal detection circuit 443 to detect switch signals, and receives data from the switch signal detection circuit 443 which indicates which of the buttons have been pressed. The control circuit 442 also instructs the counter 444 to output its data and receives data from the X counter 444X and the Y counter 444Y. The control circuit 442 is connected by an address bus and a data bus to an expansion port control circuit 446. By outputting command data to port control circuit 446, control circuit 442 is able to control expansion device 50, and is able to receive expansion device output data.

The switch signals from buttons 403–407 are input to the switch signal detection circuit 443, which detects that several desired buttons have been simultaneously pressed and sends a reset signal to the reset circuit 448. The switch signal detection circuit 443 also outputs a switch signal to the control circuit 442 and sends a reset signal to the reset circuit 448.

The counter circuit 444 contains two counters. X counter 444X counts the detection pulse signals output from the X-axis photo-interrupter 469 inside the joystick mechanism 45. This makes it possible to detect how much the operation member 451 is tilted along the X-axis. The Y counter 444Y counts the pulse signals output from the Y-axis photo-interrupter 459 inside the joysticks mechanism 45. This makes it possible to detect how much the operation member 451 is tilted along the Y-axis. The counter circuit 444 outputs the count values counted by the X counter 444X and the Y counter 444Y to the control circuit 442 according to instructions from the control circuit 442. Thus, not only is information generated for determining 360° directional movement with respect to a point of origin but also the amount of operation member tilt. As explained below, this information can be advantageously used to control both the direction of an object's movement, and also, for example, the rate of movement.

Buttons 403–407 generate electrical signals when the key tops, which protrude outside the controller 40 are pressed by the user. In the exemplary implementation, the voltage changes from high to low when a key is pressed. This voltage change is detected by the switch signal detection circuit 443.

The controller 40 generated data is explained using FIG. 10. The data generated by the controller 40 consists of the following four bytes, where the various data bits are represented as either "0" or "1": B, A, G, START, up, down, left, right (byte 1); JSRST, 0 (not used in the exemplary implementation in this application), L, R, E, D, C, F (byte 2); an X coordinate (byte 3) and a Y coordinate (byte 4). E corresponds to the button 404B and becomes 1 when button 404B is pressed, 0 when it is not being pressed. Similarly, A corresponds to button 404A, G with button 407, START with button 405, up, down, left and right with button 403, L with button 406L, R with button 406R, E with button 404E, D with button 404D, C with button 404C and F with button 404F. JSRST becomes 1 when 405, button 406L and button 406R are simultaneously pressed by the operator and is 0 when they are not being pressed. The X coordinate and Y coordinate are the count value data of the X counter 444X and Y counter 444Y, respectively.

The expansion port control circuit 446 is connected to the control circuit 442 and via an address, control and data bus to expansion device 50 via a port connector 46. Thus, by connecting the control circuit 442 and expansion device 50 via an address bus and a data bus, it is possible to control the expansion device 50 according to commands from the main CPU 11 in the video processing device 10.

The exemplary expansion device 50, shown in FIG. 9, is a back-up memory card 50. Memory card 50 may, for example, include a RAM device 51, on which data can be written to and read from desired indicated addresses appearing on an address bus and a battery 52 which supplies the back-up power necessary to store data in the RAM device 51. By connecting this back-up memory card 50 to expansion toy port) connector 46 in the controller 40, it becomes possible to send data to and from RAM 51 since it is electrically connected with the joy port control circuit 446.

The memory card 51 and game controller connector 46 provide the game controller and the overall video game system with enhanced flexibility and function expandability. For example, the game controller, with its memory card, may be transported to another player's video game system console. The memory card may store and thereby save data relating to individual achievement by a player and individual, statistical information may be maintained during game play in light of such data. For example, if two players are playing a racing game, each player may store his or her own best lap times. The game program may be designed to cause video processing device 10 to compile such best lap time information and generate displays indicating both statistics as to performance versus the other player and a comparison with the best prior lap time stored on the memory card. Such individualized statistics may be utilized in any competitive game where a player plays against the video game system computer and/or against opponents. For example, with the memory card, it is contemplated that in conjunction with various games, individual statistics relating to a professional team will be stored and utilized when playing an opponent who has stored statistics based on another professional team such as a baseball or football team. Thus, RAM 51 may be utilized for a wide range of applications including saving personalized game play data, or storing customized statistical data, e.g., of a particular professional or college team, used during game play.

Another exemplary expansion device 50 implementation is a liquid crystal display device 60 as shown in FIG. 10. This expansion device (liquid crystal display device) 60 includes a liquid crystal display (LCD) 62 and a liquid crystal display control circuit (LCD controller) 61.

By connecting the liquid crystal display device 60 to the controller 40 and joy port connector 46, it becomes possible for the liquid crystal display control circuit 61 to be electrically connected with, and to send and receive data to and from, the joy port control circuit 446. The liquid crystal display control circuit 61 outputs a video signal to the liquid crystal display based on data output from the joy port control circuit 446. The liquid crystal display 63 displays a video image based on the video signal output from the liquid crystal display control circuit 61.

A back-up memory card 50 and a liquid crystal display device 60 have been shown as examples of a controller 40 expansion device. The invention of this application is not restricted to these examples or implementations and any device may be utilized which operates by sending and/or receiving data.

Figure 12:
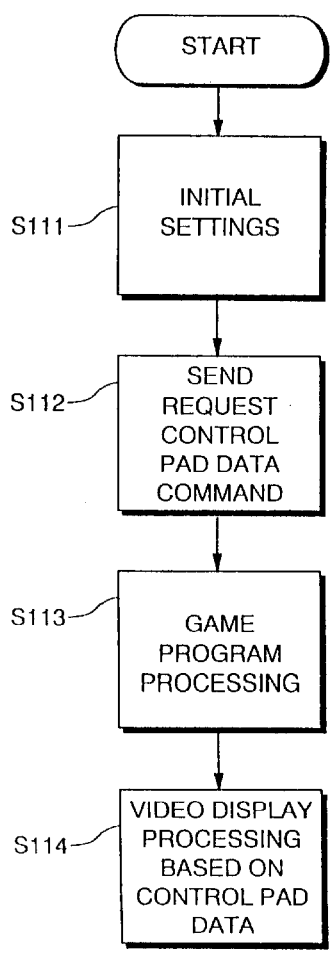
FIG. 12 is an operational flowchart for the CPU 11.

Next, the sending and receiving of data between the video processing device 10 and the controller 40 is explained beginning with the FIG. 12 flowchart for CPU 11 in the video processing device 10. At step 111, CPU 11 is initialized based on default values (not shown) stored in the program data area 202 in FIG. 3. Next, at step 112, CPU 11 outputs a control pad data request command stored in the program data area 202 to the bus control processing circuit 12. Next, at step 113, CPU 11 performs the desired video processing based on the program stored in the program data area 202 and the video data area 201 in FIG. 3. In addition, while CPU 11 is executing step 113, the bus control processing circuit 12 is executing steps 121 through 124 (in FIG. 13). Next, at step 114, the CPU 11 outputs video data based on the controller data which is stored in the control pad data area 141 in FIG. 3. After step 114 is completed, the CPU 11 repeatedly executes step 112 through step 114.

Figure 13:
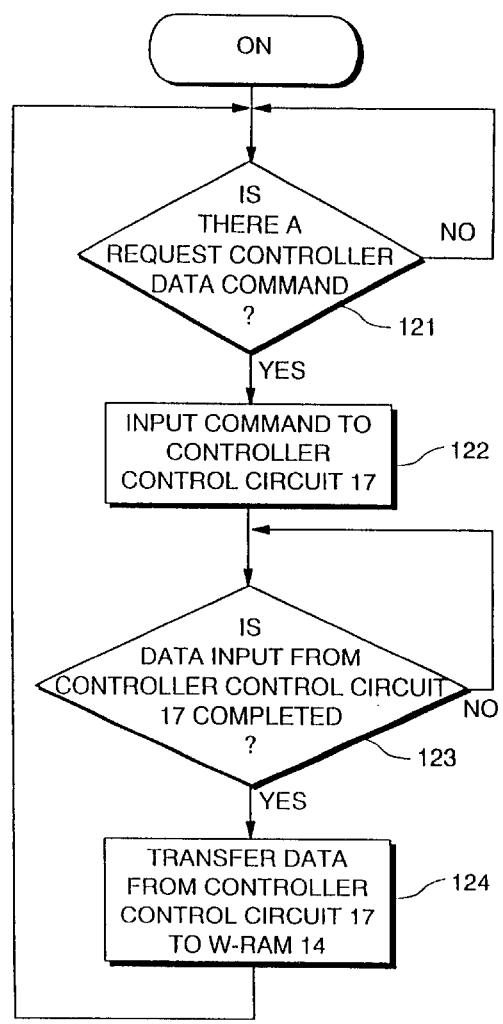
FIG. 13 is an operation flowchart for the bus control processing circuit 12.

The operation of the bus control processing circuit 13 is explained in conjunction with the FIG. 13 flowchart. At step 121, the bus control processing circuit 12 determines whether or not CPU 11 has output a controller data request command (a request command for switch data from the controller 40 or expansion device 50 data). If a controller data request command has not been output, the processing circuit 12 waits until one is output. If a controller data request command has been output, the processing circuit 12 moves on to step 122 where it outputs a command to load controller 40 data to the controller control circuit 17 (command 1 or command 2 shown below). Next, at step 123, the bus control processing circuit 12 determines whether or not the controller control circuit has received data from the controller 40 and stored such data in RAM 174. If the controller control circuit 17 has not received data from the controller 40 and stored the data in RAM 174, the bus control circuit 12 waits as shown at step 123. If controller control circuit 17 has received data from controller 40 and stored such data in RAM 174, the bus control circuit 12 moves on to step 124. At step 124, the bus control circuit 12 transfers controller 40 data stored in the controller control circuit 17 RAM 174 to the W-RAM device 14. When the bus control processing circuit 12 finishes transferring data to W-RAM 14, it returns to step 121 and repeats the operations in step 121 through 124.

An example has been shown in the flowcharts in FIG. 13 in which, after the bus control circuit 12 has transferred the data from RAM 174 into W-RAM 14, the CPU 11 processes the data which have been stored in W-RAM 14, but the CPU 11 may also directly process the data in RAM 174 via the bus control circuit 12.

Figure 14:
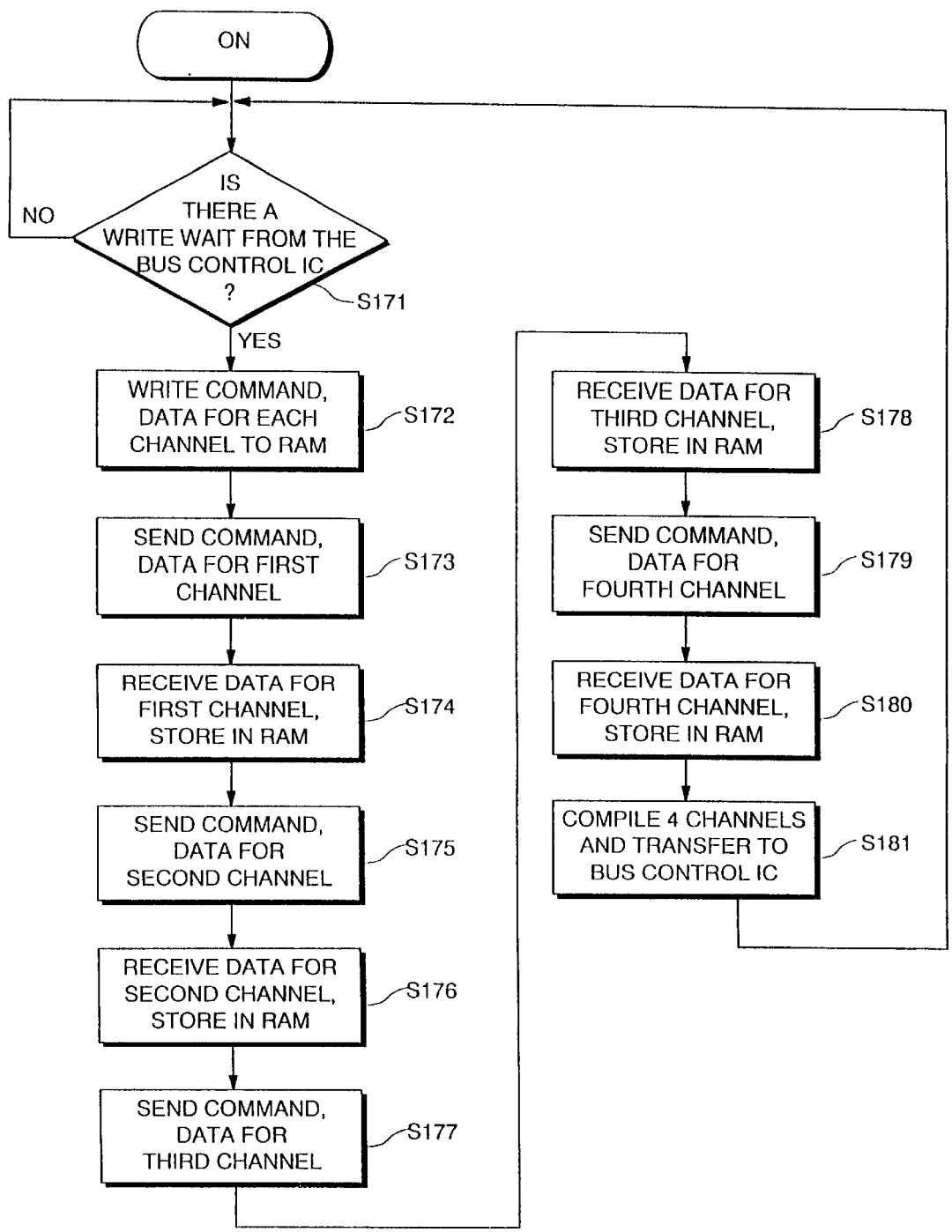
FIG. 14 is an operation flowchart for the FIG. 4 controller control circuit 17.

Next, the data transmission operations are explained, referring to the FIG. 14 operation flowchart for controller control circuit 17.

At step 171, it is determined whether or not there is a WRITE WAIT from the bus control processing circuit 12. If there is not a WRITE WAIT from the bus control circuit 12, the data transfer control circuit 171 waits until there is a WRITE WAIT from the bus control circuit 12. If there is a WRITE WAIT from the bus control circuit 12, as indicated at step 172, the data transfer control circuit 171 stores the command and/or data for channels 1–4 in RAM 174.

At step 173, the command and/or data for the first channel is sent to controller 40 which is connected to connector 181. The control circuit 442 in controller 40 performs the desired operation based on this command and/or data and outputs the data which is to be sent to the video processing device 10. The content of this data is explained in detail below in the control circuit 442 operation explanation. Next, at step 174, the data transfer control circuit 171 receives data which has been output from control circuit 442 and stores the data in RAM 174.

At step 175, the command and/or data for the second channel is sent to the controller 40 connected to connector 182. The control circuit 442 in controller 40 performs the desired operation based on this command and/or data and outputs the data which is to be sent to the video processing device 10. Data is then stored at step 176 as previously described in conjunction with step 174.

At step 177, the command and/or data for the third channel is sent to the controller 40 connected to connector 183. The control circuit 443 in controller 40 performs the desired operation based on this command and/or data and outputs the data which is to be sent to the video processing device 10. Data is then stored at step 178 as previously described in conjunction with step 174.

At step 179, the command and/or data for the fourth channel is sent to the controller 40 connected to connector 184. The control circuit 442 in controller 40 performs the desired operation based on this command and/or data and outputs the data which is to be sent to the video processing device 10. Thereafter, data is stored at step 180 as previously described in conjunction with step 174.

At step 181, the data transfer control circuit 171 compiles the data received at steps 174, 176, 178 and 180 and transfers the data to the bus control processing circuit.

The peripheral device channel is designed to accept various types of future peripheral devices. The present exemplary embodiment uses an extensible command which is to be interpreted by peripherals including future devices. As shown in FIG. 5, the commands occupy the first byte of a TxData area in RAM 174. Many bits and commands are reserved for future extension. Exemplary commands relating to peripheral devices are shown below and in FIGS. 16 through 21. Commands are provided as explained below for read and writing data to a memory card. Backup data for a game may be stored on a memory card. In this fashion, no backup battery need be used for this memory during game play since it plugs into the controller. Certain of these commands contemplate an expansion memory card module. Exemplary controller commands shown in FIGS. 16 through 20 are explained below and in conjunction with the FIG. 15 controller 40 controller circuit 44 flowchart.

Command 0: Ask each peripheral device's type and status flag

TxSize: 1 byte RxSize: 3 byte

Figure 16:
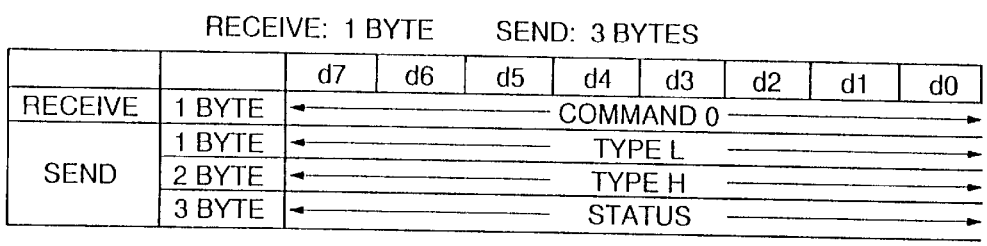
FIG. 16 is a table showing the data sent to and from the control circuit 442 when command 0 has been sent from the controller control circuit 17.

As shown in FIG. 16, this command is used to ask the peripheral device's type and status flags, and its answer is supposed to be returned into RX data area.

Peripheral Device's Type

This type is provided from the connected peripheral device about its functions and features as shown for example below.

|   | b7 | b6 | b5 | b4 | b3 | b2 | b1 | b0 |
|---|---|---|---|---|---|---|---|---|
| H | Reserved | Reserved | Reserved | Reserved | Reserved | Reserved | Reserved | Reserved |
| L | Reserved | Reserved | Reserved | Reserved | Reserved | With JoyPort | Reserved | Joystick ABS Count, Standard |

L b0: In the case of the standard controllers, they would send a "1" response which indicates that controllers contain counters and send the joystick data as the absolute value.

L b2: In the case of the standard controllers, they would send a "1" response which indicates that controllers have the port (JoyPort) which connects to the exchangeable memory card shown in FIG. 7.

Status (Flags)

The status data may, for example, be comprised of status flags which are the response from the connected peripheral device about its status. In the case of standard controllers, these flags are used for memory card.

| b7 | b6 | b5 | b4 | b3 | b2 | b1 | b0 |
|---|---|---|---|---|---|---|---|
| Reserved | Reserved | Reserved | Reserved | Reserved | ADDR. CRC report | Card Xchg | Card ON | b0: If a memory card is connected to the controller 40, this flag is set to "1". If not, this flag is set to "0".

b1: After a controller is plugged in, if a memory card is pulled out, this flag is set to "1". This flag is reset to "0" when controller plugged and power supplied, or command 0 or 255 (controller software reset command) issued with the memory card connected. If controller is plugged in and power supplied without a memory card, this flag is indefinite.

b2: AddrCRC (cyclic redundancy code) report is sent from the controller in communicating with JoyPort. This flag status "1" means that Address H/L are not transferred to the controller correctly. This flag is reset to "0", when peripheral device plugged in and power is supplied or command 0 or 255 is issued.

Command 1: Access Referenced Controller Data

TxSize: 1 byte RxSize: 4 byte

Figure 17:
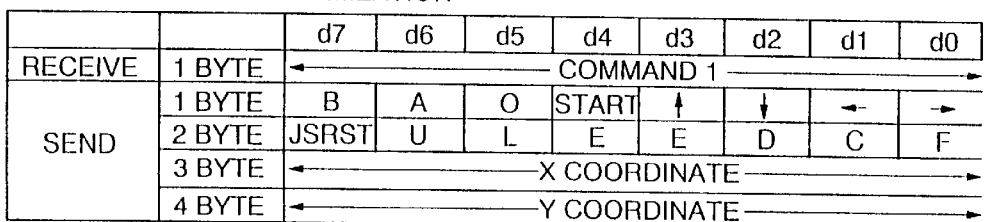
FIG. 17 is a table showing the data sent to and from the control circuit 442 when command 1 has been sent from the controller control circuit 17.

As shown in FIG. 17, Command 1 is used for getting controller's button condition and joystick condition. Joystick's counter is reset to "0x00" when controller is plugged in and power is supplied, command 0 or 255 issued, Joy-Channel reset issued or L, R, START buttons pushed at the same time. JRRes bit shows that L, R, START buttons are pushed at the same time.

Figure 15:
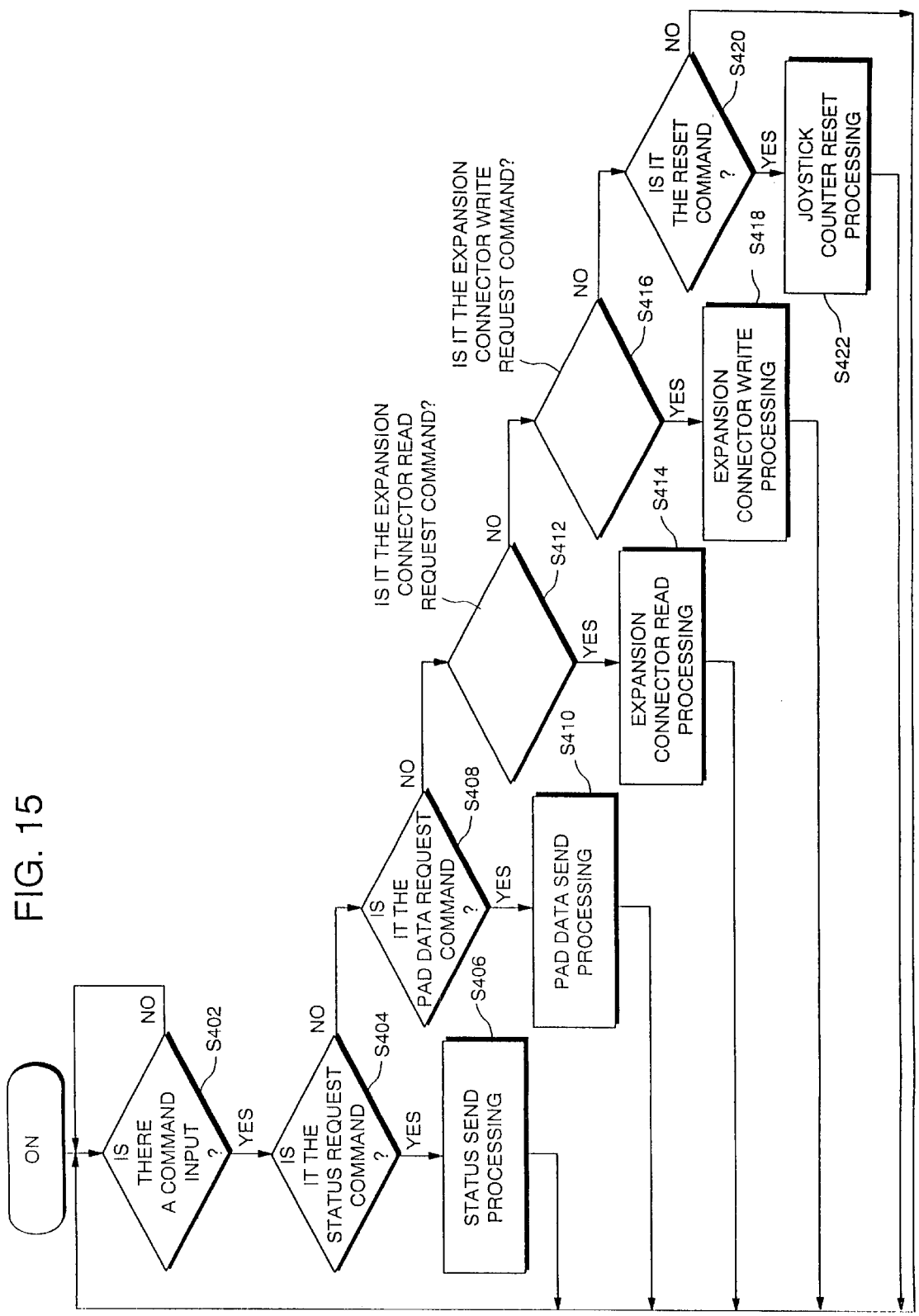
FIG. 15 is an operation flowchart for the controller 44 circuit.

The operational flowchart for the controller 40 controller circuit 44 is shown in FIG. 15. First, at step 402, it is determined whether or not a command has been input from the video processing device 10 to the control circuit 443. If a command has not been input, the control circuit 442 waits until a command is input. If a command has been input, it is determined at step 404 by, for example, decoding the received bit pattern whether or not the command is a status request command (command 0). If it was not command 0, processing moves to step 408. If it was command 0, processing moves to step 406 and status send processing is performed.

The data sent between the video processing device 10 and the controller 40 when command 0 has been output by the CPU 11 is explained referring to FIG. 16, which shows exemplary status data. When the controller 40 control circuit 442 receives the send controller type command 0 data, which consists of 1 byte (8 bits), TYPE L (1 byte), TYPE H (1 byte) and STATUS are sent. TYPE L and TYPE H are used to indicate for which function the apparatus connected to the expansion Coy port) connector 46 is waiting, and are data which are stored in the expansion device 50. Thus, it is possible for the video processing device 10 to recognize what kind of expansion device 50 is connected to controller 40. STATUS data may include a variety of status information including data which shows whether an expansion device 50 is connected to the expansion port and whether an expansion device is connected after a reset.

At step 408, a check is made to determine whether or not the command which was input was a pad data request command (command 1). If it was not command 1, processing moves to step 412. If is was command 1, processing moves to step 410 and pad data send processing is executed.

The data sent between the video processing device 10 and the controller 40 when the access referenced controller for pad data has been output by CPU 11 is explained in conjunction with FIG. 17 which shows exemplary command 1 data. When the control circuit 442 of the controller 40 receives command 1 data, which consists of 1 byte (8 bits), as an example, the following information is sent: status and data (16 bits) comprising B, A, G, START, up, down, left, right, L, R, B, D, C, F and the JSRST (1 bit) and data from counter 444X and counter 444Y (16 bits). Sending such data to video processing device 10 enables the video processing device 10 to recognize how the controller 40 is being manipulated by the operator.

At step 412, it is determined whether the command which has been input is an expansion connector read request command (command 2). If it was not command 2, processing moves to step 416. If it was command 2, processing moves to step 414 and expansion connector read processing is performed.

Figure 18:
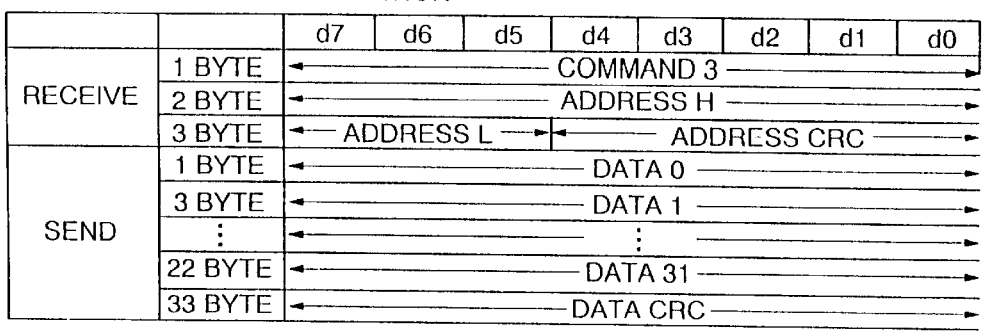
FIG. 18 is a table showing the data sent to and from the control circuit 443 when command 2 has been sent from the controller control circuit.

The data sent between the video processing device 10 and controller 40 when command 2 has been output by CPU 11 is explained referring to FIG. 18, which shows such data. When the control circuit 442 of the controller 40 receives the READ RAM command 2 data, which consists of 1 byte (8 bits), ADDRESS H (8 bits), which specifies the most significant bits of the address, ADDRESS L (3 bits), which specifies the least significant bits of the address, and ADDRESS CRC (5 bits), which checks for errors in the address data, data is sent to the video processing device 10 that is stored in the expansion device 50 (e.g., 32 bytes) based on the address data which has been received and CRC (8 bits), which is used to check for data errors. Thus, by connecting the expansion device 50 to the video processing device 10, it is possible for the video processing device 10 to process data from the expansion device 50.

At step 416, it is determined whether or not the command which has been input was an expansion connector write request command (command 3). If it was not command 3, processing moves to step 420. If it was command 3, processing moves to step 418 and expansion connector read processing is performed.

The data sent between the video processing device 10 and the controller 40 when the WRITE RAM command 3 is output by the CPU 11 is explained referring to FIG. 19. When the controller 40 control circuit 442 receives command 3 data, which consists of 1 byte (8 bits), the following information is also received: ADDRESS H (8 bits), which are the most significant address bits, ADDRESS L (3 bits), which are the least significant address bits, ADDRESS CRC (5 bits), which is to check for errors in the address data being sent, and the data for storage in expansion device 50 (32 bytes). A CRC (8 bits), which is used to check for data errors is sent to the video processing device 10. Thus, by connecting the expansion device 50 with the video processing device 10, it is possible for the video processing device 10 to control the expansion device 50. By thus connecting expansion device 50 to the video processing device 10, it also becomes possible to vastly improve and expand the functions of controller 40.

At step 420, it is determined whether or not the command which has been input is a reset command (command 255). If it was not command 255, processing branches back to step 402 where the routine is repeated. If it was command 255, processing moves to step 422 and joystick counter reset processing is performed.

The data sent between the video processing device 10 and the controller 40 when command 255 is output by CPU 11 is explained in conjunction with FIG. 20. When controller 40 control circuit 442 receives command 255 data, which consists of 1 byte (8 bits), a reset signal is generated and the X counter 444X and the Y counter 444Y are reset. The controller 40 then sends TYPE L (1 byte), TYPE H (1 byte) and STATUS information as described above in conjunction with FIG. 16.

Resetting of the joystick 45 is explained in detail below. There are 3 reset methods which determine the point of origin for the joystick 45: 1) reset by operating the buttons; 2) reset by turning the power ON-OFF; and 3) reset by the video processing device 10.

Figure 21:
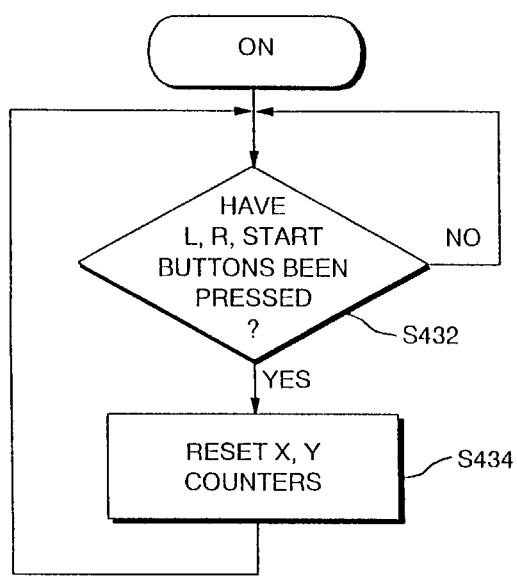
FIG. 21 is a flowchart for the operation to reset the X counter 444X and Y counter 444Y by button operation.

1) Reset by button operation:

Resetting the counter 444, which stores the tilt condition data for the joystick 45, is explained in conjunction with the FIG. 21 flowchart. First, at step 432, the switch signal detection circuit 443 detects whether or not button 406L, button 406R and button 405 have been simultaneously pressed. Thus, detection of a continuous switch signal is continuously performed even when the three buttons are not being pressed. When the three buttons have been simultaneously pressed, a reset signal is output.

When this reset signal is output at step 434, the count values in the X counter 444X and the Y counter 444Y are reset. Consequently, the origin of the joystick is determined each time button 406L, button 406R and button 405 are simultaneously pressed.

In this exemplary implementation, the switch signal detection circuit 443 generates a reset signal when button 406L, button 406R and button 405 are simultaneously pressed but, it does not have to specifically be in response to these three buttons. For example, the buttons pressed by the user are not limited to three but, for example, could be two or four buttons. In addition, the reset features could be tied to any other set of buttons not just the three buttons described above.

Figure 22:
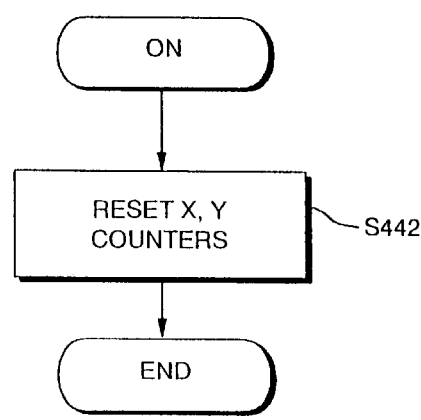

2. Reset by power ON-OFF:

Another method for resetting the counter 444 is explained referring to the FIG. 22 flowchart. First, the POWER-ON reset circuit 447 outputs a reset signal as power is supplied to controller 40 by the user turning the video processing device 10 power switch ON when the controller 40 is connected to the video processing device 10, or, if the controller 40 is not connected to the video processing device 10, by the user plugging the connection jack of the controller 40 into a controller connector 181–84 on the video processing device 10. At step 442, the count value in the X counter 444X and the Y counter 444Y are reset by this reset signal having been output. Consequently, the joystick origin is determined every time power is supplied to the controller 40.

3. Reset by video processing device 10:

A further method for resetting is described above in conjunction with step 420 and step 422 of FIG. 15. This reset method makes it possible to freely determine the joystick 46 origin under program control in accordance with the game program being executed by video processing device 10.

The X counter 444X and the Y counter 444Y can be reset by the above methods. Outputting a reset signal when the operation member 451 is disposed in the center (when the user is not manipulating it), enables the user to prevent erroneous count values from being sent to the video processing device 10 when such erroneous count values have been stored in the X counter 444X and the Y counter 444Y.

In accordance with an illustrative embodiment a game programmer may code a game program to include the above described lower level commands by, for example, including system library function calls. In this fashion, routines may be accessed from the system library and executed by the CPU 11 to result in the command generation described above. Examples of such library function calls are shown below together with a brief description thereof.

NAME:

osContinit—poll for and reset game controllers.

DESCRIPTION:

The osContinit call resets all the game controllers and returns a bit pattern to indicate which game controllers are connected. It also returns game controller's type and status back to status.

The game controller's type can be one of the following defined constants:

| | |
|---|---|
| CONT_ABSOLUTE | The controller contains counters as described herein and sends the joystick data as the absolute value. |
| CONT_RELATIVE | The controller contains counters inside and sends the joystick data as the relative value. |
| CONT_JOYPORT | The controller has joyport expansion .port The standard controllers have the joyport which connects to exchangeable memory card. |

The game controller's status are used for memory card and can be one of the following defined constants:

| | |
|---|---|
| CONT_CARD_ON | This bit is set if memory card is connected to the controller. |
| CONT_CARD_PULL | After controller is reset if memory card is pulled out, this bit will be set. |
| CONT_ADDR_CRC_ER | This bit is set if the address are not transferred to joyport correctly. |

The error number return from controllers can be:

| | |
|---|---|
| CONT_NO_RESPONSE_ERROR | The controller doesn't response. |
| CONT_OVERRUN_ERROR | The controller sends data at higher data transfer rate than the hardware handling capability. |
| CONT_FRAME_ERROR | The controller sends data at longer-term bit than the specified length. |
| CONT_COLLISION_ERROR | The controller receives data during sending the data. |

NAME:
   osContStartQuery, osContGetQuery—obtain game controller status and type.
DESCRIPTION:
   The osContStartQuery call issues a query command to game controllers to obtain game controller status back to status.
   The game controller's type can be one of the defined constants shown in osContinit.
   The game controller's status are used for memory card and can be one of the defined constants shown in osContinit.
   The error number return from game controllers can be as shown in osContinit.
NAME:
   osContReset—reset all game controllers.
DESCRIPTION:
   The osContReset call resets all game controllers and returns all joystick back to neutral position. It also returns game controller's status back to status.
NAME:
   osContStartReadData, osContGetReadData—obtain game controller input settings.
DESCRIPTION:
   The osContStartReadData call issues a read data command to obtain game controller input settings, and the osContStartReadData call returns joystick data and button settings to pad.
   The joystick data are signed char and in the range between 80 and −80. The game controllers input settings can be the following defined constants:

| | |
|---|---|
| CONT_START | Button START |
| CONT_A | Button A |
| CONT_B | Button B |

-continued

| | |
|---|---|
| CONT_C | Button C |
| CONT_D | Button D |
| CONT_E | Button E |
| CONT_F | Button F |
| CONT_UP | Button UP |
| CONT_DOWN | Button DOWN |
| CONT_LEFT | Button LEFT |
| CONT_RIGHT | Button RIGHT |
| CONT_G | Button G |
| CONT_L | Button L |
| CONT_R | Button R |

The error number return from game controllers can be as shown in osContinit.
NAME:
   osContAddressCrc, osContDataCrc—compute CRC for game controller address, data information.
DESCRIPTION:
   The osContAddressCrc and osContDataCrc calculate the CRC values for the game controller. The addr is a pointer to an 11-bit address buffer and the data is a pointer to a 32-byte data buffer. The CRC generators are $x^4+x^2+1$ and $x^7+x^2+1$ for osContAddressCrc and isContDataCrc respectively, and the return values are 5-bit and 8-bit long.

EXAMPLES OF SCREEN EFFECTS

Figure 23A:
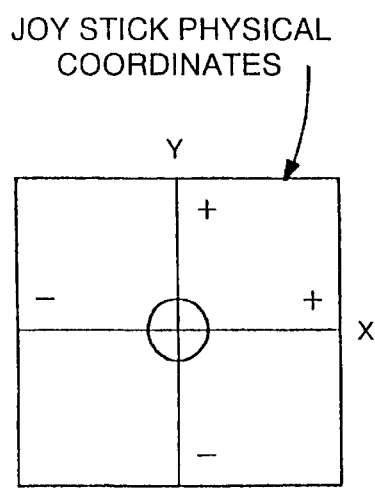
FIGS. 23A and B depicts the physical coordinates of the operation member 451 and the display screen for display 30.

The use of the controller 40 (and the system described herein) permits a wide range of unique screen effects to be generated. An initial example in which the screen image is uniquely changed by the controller is explained using FIGS. 23A, 23B, 24A and 24B. The drawing in FIG. 23A represents the amount of physical tilt of the operation member in a coordinate system. The circle drawn in the center represents the position of the operation member 45 in the condition in which the operator is not manipulating it (the operation member 451 is in a state standing perpendicular to the housing). If the operation member 451 is tilted upward, as seen by the operator, the circle moves in the + direction along the Y axis while, if the operation 451 is tilted to downward, the circle moves in the − direction along the Y axis. Likewise, if the operation member 451 is tiled to the right, as seen by the operator, the circle moves in the + direction along the X axis while, if the operation member 451 is tiled to the left, the circle moves in the − direction along the Y axis.

Figure 23B:
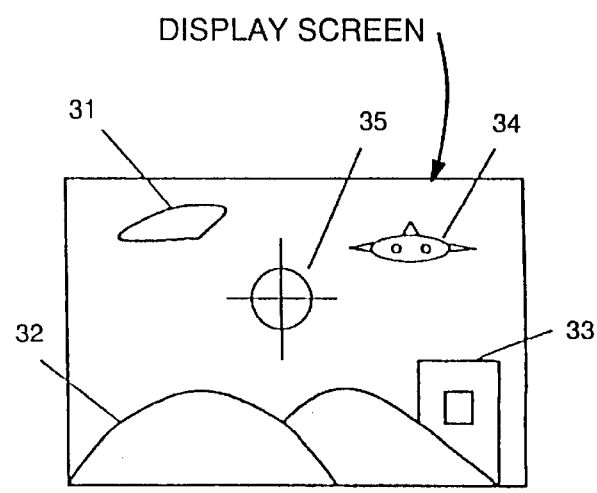

The drawing of FIG. 23B shows an exemplary video game display screen in which a sight is moved up, down, left and right by tilting the operation member to the front, rear, left and right thereby aligning the sight with the enemy 34. The cloud 31, mountains 32 and building 33 are changing background images which scroll, etc., and the enemy 34 is an object which moves around freely on the screen. For example, if the enemy 34 appears in the upper-right of the screen as illustrated, the operator would tilt the operation member 451 to the right and to the front. When this is done, controller 40, X counter 444X and its count values increases. The count value data are sent to the video processing device 10. The video processing device 10 uses such additional count value data to change the display position of the sight 35. As a result, the sight 35 and the enemy 34 become overlaid. If a button such as button 404A, etc., is pressed when they are thus overlaid, such switch data also, like the aforementioned additional amount value data, are sent to the video processing device 10. As a result, the video processing device 10 generates the video signal to display a missile (not shown), etc. on the screen and to display the enemy 34 being hit.

Figure 24A:
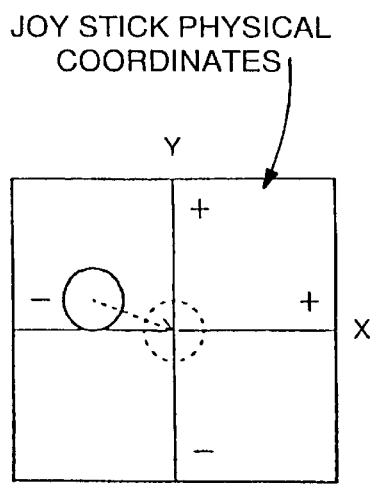
FIG. 24A and B represent the physical coordinates of the operation member 451 and the display screen for display 30 when the operation member 451 is reset to a new origin position.
Figure 24B:
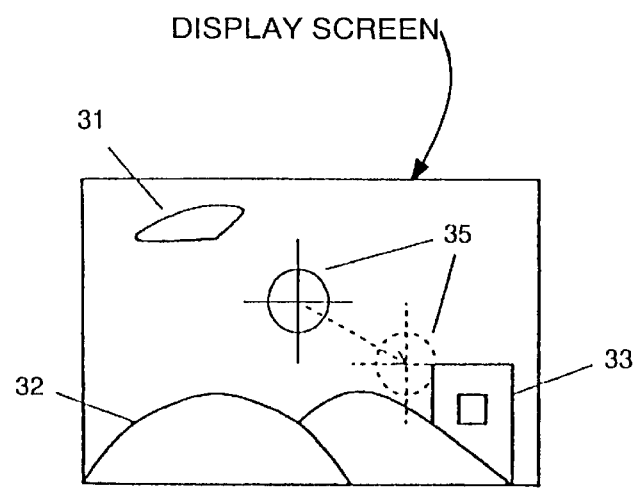

Next, an example in which the operation member 451 is moved (tilted) off-center and reset is explained in conjunction with FIGS. 24A and 24B. When the X counter 444X and Y counter 444Y have been reset at the coordinate position shown by the solid circle in the drawing on the left in FIG. 24, if the operator removes a hand from the operation member 451, the operation member will return to the coordinate center position (the position shown by the dotted circle). The changes in the video display under such circumstances are explained using the drawing FIG. 24B. First, when X counter 444X and Y counter 444Y have been reset, the sight 35 is displayed in the position of the solid circle just as in the FIG. 23B drawing. This is because the count values of the X counter 444X and Y counter 444Y are 0 which is the same count value as the initial values. Next, when the operator's hand is removed from the operation member 451 and the operation member 451 returns to the center position of the coordinates, the X counter 444X adds and its count value increases and the Y counter 444Y subtracts and its count value decreases. These count value data are sent to the video processing device 10. The video processing device uses such additional count value data to change the display position of the sight 35 (changing it to the position of the dotted sight 35).

This kind of resetting would be performed, for example, when an operator predicts that the position at which the enemy 34 will appear is the position of the dotted sight 35 in the drawing on the right in FIG. 24. In this case, an operator would like to align the sight 35 with the position of the dotted sight the instant the enemy 34 appears. However, continuously holding the sight 35 at the position of the dotted sight 35 is a hindrance to game play and there is the possibility that the operator will be unable to respond if the enemy 34 appears from an unexpected place. Therefore, the reset function described above is used to enable the operator to align the sight 35 to other locations. More specifically, first, using the solid sight 35 as a reference, the operator tilts the operation member 451 so that the sight 35 is displayed in the intended position which is the position at which the enemy 34 is predicted to appear (the position of the dotted sight 35). At this time, the physical coordinates of the operation member 451 are at the position of the solid circle in the FIG. 24A drawing. At this time, the operator simultaneously presses the three buttons 406L, 406R and 405. When this is done, the X counter 444x and the Y counter 444Y are reset and the sight 35 is displayed in the position of the solid sight 35. Then, the operator freely moves the sight 35 and waits for the enemy 34 to appear. If the enemy 34 appears at the position of the dotted sight 35, the operator releases their hand from the operation member 451. When this happens, the operation member 451 returns to the physical coordinate position of the dotted circle in the FIG. 24B drawing. When the operator accurately aligns the sight 35 with the enemy 34 and presses a switch, such as button 404A, etc., a missile (not shown), etc., is displayed on the screen and hits the enemy 34.

In addition, if reset is performed as described above, the operation member 451 can be significantly moved to the lower right. For example, this is effective when the operator wants to move the operation member 451 a long way towards the lower right.

Reset by button operation was used in the exemplary implementation described above, but reset by power ON-OFF or reset by the video processing device could also have been used.

It should be recognized, that, in accordance with the present invention joystick 45 may be employed in a multitude of different ways either in conjunction with directional switch 403 or as the fundamental object motion controlling mechanism utilizable by the player. Thus, not only may joystick 45 be advantageously utilized to move an object such as sight 35 in the above example, but at the same time directional switch 403 may also be utilized for controlling moving object motion.

Joystick 45 provides far more movement control information to a video processing system than is available from a directional type switch such as switch 403. While the character movement information that can be generated by a cross-type switch 403 is limited, joystick mechanism 45 allows an operator to define 360° of motion with respect to a given point of origin. Not only may a given direction be defined by joystick mechanism 45 but also, for example, the rate of motion along that direction can be specified by detecting the amount of tilt in a given direction.

The specific moving object control possibilities and the resulting screen effects contemplated by the present invention through the use of controller 40 are too numerous to delineate. By way of example only, directional switch 403 may be employed by a player to control an object's movement like conventional video game controllers while, at the same time, joystick mechanism 45 may be used by the player to manipulate a target flying around the screen. The target may, for example, be controlled to fly anywhere on the screen, at any angle, at widely varying velocities. In the context of the driving game, the joystick mechanism may be utilized as a combination accelerator, brake and steering mechanism. In such a game, the video processing device 10 detects how far forward or backward the joystick mechanism is manipulated, to determine how fast a displayed vehicle accelerates or brakes. The amount the joystick 45 is displaced to the left or right can be used, for example, to determine how sharply the vehicle will turn.

In a game of the applicants' assignees' Mario genre, the joystick mechanism 45 may be utilized to permit three-dimensional control over a character's movement. Such a video game, if designed for play on the system described in copending incorporated application Ser. No. 08/562,288, depicts a three-dimensional world on the user's TV display screen. Joystick mechanism 45 gives a player 360° control over a Mario type character's movement. Thus, as opposed to controlling motion with a conventional, directional switch pad 403 where motion is controllable to the left, right, up or down (or along the four diagonals), directional control may be exercised in any of the 360° angular directions. By detecting, for example, the amount of joystick member tilt from the free standing position, the game program controlled processor determines based upon the programmed association of the amount of tilt with rate of motion, whether Super Mario is walking slowly, walking quickly, jogging, running, etc. Accordingly, the joystick mechanism may be advantageously utilized as controlling dual functions by, for example, not only defining a vector along which a character is to move but also defining the velocity for object travel along such vector.

The above described origin resetting feature of the present invention, when applied to three-dimensional type displays generated utilizing the system described in the above incorporated application Ser. No. 08/562,288, may be advantageously utilized in games to change the "camera angle" to thereby modify the point of view at which a scene is viewed. For example, if an enemy were to fly off the screen heading towards the side of a building, joystick mechanism 45 may be utilized to change the perspective view so that the player, in effect determines the scene viewing angle. Thus, for example, if an enemy is hiding behind a building and can not be seen from the current point of view, joystick mechanism 45 may be utilized to change the point of origin to move the "camera angle" so that the building is viewed from the side even though the character is not moved. Thus, even though an enemy does not have a direct view of a player's character and, vice versa, due to blockage by a building, the camera angle may be changed so that the player can see both the enemy and the controlled character.

By virtue of having both a directional switch 403 and a joystick mechanism 45, a player has the unique ability to both move an object and manipulate a target simultaneously using the left and right hands. Thus, switch 403 may be used to move a character while joystick mechanism 45 is used to align a firing mechanism in a particular direction to permit proper alignment for shooting a target.

The illustrative embodiment is only one exemplary implementation. For example, it is possible to apply the invention in this application to any type of video processing as long as it involves video processing in which the operator changes the video image by manipulating an operation member.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An operation controlling device which is connected, in use, to a video processing device console which generates video data to be displayed on a display unit in accordance with a stored program and which responds to an operator's manipulations to provide changes to displayed video data, said operation controlling device comprising:

an operation controlling device housing;

an operation member protruding from said housing which, in use, is tilted by an operator within a desired range and is supported such that it stops at a desired position when not being manipulated by the operator, rotor bodies within said housing which rotate according to the amount of tilt of said operation member, rotation detectors within said housing which detect the rotated condition of said rotor bodies, counting circuitry within said housing for maintaining count values related to rotation amounts of the rotor bodies which are detected by said rotation detectors, reset signal generation circuitry within said housing for generating reset signals in response to a predetermined condition to reset the count values of said counting circuitry, and data transfer circuitry within said housing for transferring the count values which have been counted by said counting circuitry to said video processing device.

2. The operation controlling device in accordance with claim 1, wherein said reset signal generation circuitry generates reset signals which reset the count values of said counting circuitry in response to the application of power.

3. The operation device in accordance with claim 1, further including at least one switch which generates an electrical signal when pressed by an operator, and wherein said reset signal generation circuitry generates said reset signal in response to one of said predetermined condition and a signal from said at least one switch.

4. An operation controlling device which is connected, in use, to a video processing device which generates video data to be displayed on a display unit in accordance with a stored program and a operator's manipulations of said operation controlling device, said operation controlling device comprising:

a housing which, in use, is grasped by both hands of an operator;

an operation member protruding from said housing which, in use, is tilted by a finger of an operator within a desired range and is supported such that it stops at a desired position when not being manipulated by the operator to thereby define an operation member point of origin, said operation member being operable to generate operation member position data for controlling movement of a displayed object along any one of a substantially continuous range of angular directions with respect to a coordinate reference frame defined by said point of origin; and a directional switch protruding from said housing for generating data for controlling movement of a displayed object in at least a plurality of directions.

5. An operation controlling device which is connected, in use, to a video processing device which generates video data to be displayed on a display unit in accordance with a stored program and which responds to an operator's manipulations of said operation controlling device, said operation controlling device comprising:

an operation member which, in use, is tilted by an operator within a desired range and is supported such that it stops at a desired position when not being manipulated by the operator to thereby define an operation member point of origin, said operation member being operable to generate operation member position data for controlling movement of a displayed object along any one of a substantially continuous range of angular directions with respect to a coordinate reference frame defined by said point of origin; and processing circuitry for receiving at least one digital command having a plurality of bits from said video processing device and for transferring operation member position data to said video processing device in response to said digital command.

6. An operation member according to claim 5, further including reset signal generation circuitry for resetting said point of origin.

7. For use with a video game system console having a game program executing processing system including a main microprocessor and a coprocessor, coupled to said main microprocessor, for cooperating with said main microprocessor to execute said video game program and at least one player controller operable by a player to generate video game control signals and including command processing circuitry; a portable storage device for controlling the operation of said video game system console comprising:

a memory medium for storing video game instructions and graphics data;

a connector for transferring said video game instructions and said graphics data retrieved from said memory medium to said video game system console;

said video game instructions including at least one player controller instruction for causing said game program executing processing system to send a digital command having a plurality of bits to said player controller for decoding and processing.

8. A portable storage device in accordance with claim 7, wherein said digital command is a request for the controller to send data to the game program executing processing system identifying its controller type.

9. A portable storage device in accordance with claim 7, wherein said digital command is a request for the controller to send the status of controller switches to the game program executing processing system.

10. A portable storage device in accordance with claim 7, wherein said command is a request for the controller to send data identifying its device type.

11. A portable storage device in accordance with claim 7, wherein said digital controller includes a memory and said command is a request for the controller to send data stored in the controller memory.

12. A portable storage device in accordance with claim 7, wherein said digital command is a controller data request command, said controller being operable to transfer controller data to said game program executing processing system and said main microprocessor being operable to generate video data based upon said transferred controller data.

13. A portable storage device in accordance with claim 12, wherein said controller includes a joystick mechanism having position indicating circuitry and wherein said controller data includes joystick position information.

14. A portable storage device in accordance with claim 7, wherein said controller includes a joystick mechanism having position indicating circuitry and wherein said digital command causes the controller to reset the position indicating circuitry.

15. For use with a video game system console having a game program executing processing system including a main microprocessor and a coprocessor, coupled to said main microprocessor, for cooperating with said main microprocessor to execute said video game program and at least one player controller operable by a player to generate video game control signals and including command processing circuitry, said at least one player controller having a joystick biased in a first orientation defining a point of origin; a portable storage device for controlling the operation of said video game system console comprising:

a memory medium for storing video game instructions and graphics data;

a connector for transferring said video game instructions and said graphics data retrieved from said memory medium to said video game system console;

said video game instructions including at least one player controller instruction for causing said game program executing processing system to send a digital command having a plurality of bits to said player controller to enable said point of origin to be changed.

16. For use with a video game system console having a game program executing processing system including a main microprocessor and a coprocessor, coupled to said main microprocessor, for cooperating with said main microprocessor to execute said video game program and at least one player controller operable by a player to generate video game control signals and including a first set of control switches for controlling the motion of a displayed object and a joystick mechanism moveable by a player for generating display position signals; a portable storage device for controlling the operation of said video game system console comprising:

a memory medium for storing video game instructions and graphics data;

a connector for transferring said video game instructions and said graphics data retrieved from said memory medium to said video game system console;

said video game instructions including at least one player controller instruction for causing said game program executing processing system to send a digital command having a plurality of bits to said player controller to transfer digital data from said first set of switches and said joystick mechanism to said game program executing processing system.

17. For use with a video game system console having a game program executing processing system including a game microprocessor and a coprocessor, coupled to said game microprocessor, for cooperating with said game microprocessor to execute said video game program and at least one player controller operable by a player to generate video game control signals; a portable storage device for controlling the operation of said video game system console comprising:

a memory medium for storing video game instructions and graphics data;

a connector for transferring said video game instructions and said graphics data retrieved from said memory medium to said video game system console;

said video game instructions including at least one player controller instruction for causing said main microprocessor to send a request command for controller data and for causing said coprocessor to generate a digital command housing a plurality of bits to initiate the transfer of video data from the controller to a memory accessible by said main microprocessor.

18. A portable storage device in accordance with claim 17, wherein said video game console includes a random access memory for storing player controller related data, and wherein said coprocessor command is used to access said random access memory.

19. A portable storage device in accordance with claim 17, wherein said controller includes an expansion memory and said game microprocessor command is a request to access said expansion memory.

20. A portable storage device in accordance with claim 18, wherein said video game system console includes a peripheral interface processing system coupled to said coprocessor and said random access memory is in said peripheral interface processing system.

21. A portable storage device in accordance with claim 20, wherein said video game system console includes a further random access memory and said coprocessor command accesses information from said random access memory and loads said information into said further random access memory.

22. In a video game system having a game program executing processing system including a game microprocessor and a coprocessor, coupled to said game microprocessor, for cooperating with said game microprocessor to execute said video game program and at least one player controller operable by a player to generate video game control signals, a player controller processor subsystem, coupled to said coprocessor and a portable storage device for controlling storing said video game program for controlling the operation of said video game system; a method for operating said video game system comprising the steps:

executing an instruction stored in said portable storage device by said game microprocessor causing said game microprocessor to generate a player controller data request command;

generating by said coprocessor in response to said player controller data request command, a command to transfer data from said player controller;

generating by said player controller processor subsystem in response to said command to transfer data, a digital controller command having a plurality of bits to initiate data transfer; and processing said digital controller command in said player controller and transferring said player controller data.

23. A method according to claim 22, wherein said video game system includes a plurality of controllers and further including the step of compiling data by said peripheral processing subsystem for the plurality of controllers and transferring the compiled data to said game program executing system.

24. In a video game system having a game program executing processing system including a game microprocessor and a coprocessor, coupled to said game microprocessor, for cooperating with said game microprocessor to execute said video game program and at least one player controller including command processing circuitry and operable by a player to generate video game control signals, a player controller processor subsystem, coupled to said coprocessor and a portable storage device for controlling storing said video game program for controlling the operation of said video game system, a method for operating said video game system comprising the steps:

executing an instruction stored in said portable storage device by said game microprocessor causing said game microprocessor to generate a digital player controller command having a plurality of bits for initiating said controller to perform a predetermined operation;

generating by said coprocessor in response to said player controller command, a command from said coprocessor to perform said predetermined operation identified by said command;

generating by said player controller processor subsystem in response to said command from said coprocessor, a controller command to initiate said predetermined operation; and performing, by said controller command processing circuitry, the operation indicated by said digital controller command.

25. For use with a video game system console having a game program executing processing system including a main microprocessor and a coprocessor, coupled to said main microprocessor, for cooperating with said main microprocessor to execute said video game program and a player controller operable by a player to generate video game control signals and including a first set of control switches for controlling the motion of a displayed object and an operation controlling mechanism moveable by a player for generating display position signals; a portable storage device for controlling the operation of said video game system console comprising:

a memory medium for storing video game instructions and graphics data;

a connector for transferring said video game instructions and said graphics data retrieved from said memory medium to said video game system console;

said video game instructions including at least one instruction for causing said game program executing processing system to respond to signals from said first set of switches to control the motion of a displayed moving object and to respond to signals from said operation controlling mechanism to independently control the motion of another moving object.

26. A portable storage device according to claim 25, wherein said operation controlling mechanism is a joystick.

27. A portable storage device according to claim 26, wherein said first set of switches includes a cross-type directional switch.

28. Apparatus for executing video game programs stored in an external memory comprising:

a game program executing processing system for executing a video game program;

a memory operatively coupled to said game program executing processing system for storing information for processing by said game program executing processing system;

a housing including a plurality of operator control keys and including an insertion port for receiving at least two different types of expansion devices;

said game program executing processing system being operable to execute at least one instruction for enabling said processing system to process signals from the type of expansion device to which it is connected, and being operable to execute at least one instruction to initiate receiving digital information from at least one of said different types of expansion devices for processing by said game program executing processing system.

29. Apparatus according to claim 28, wherein said plurality of operator control keys includes a cross switch.

30. Apparatus according to claim 28, wherein said plurality of operator control keys includes a cross switch disposed on a left hand portion of said housing and a plurality of control buttons on a right hand portion of said housing.

* * * * *